United States Patent
Mahgerefteh et al.

(10) Patent No.: US 10,802,214 B2
(45) Date of Patent: Oct. 13, 2020

(54) ADIABATICALLY COUPLED PHOTONIC SYSTEMS WITH VERTICALLY TAPERED WAVEGUIDES

(71) Applicant: Finisar Corporation, Sunnyvale, CA (US)

(72) Inventors: Daniel Mahgerefteh, Los Angeles, CA (US); Jin-Hyoung Lee, Sunnyvale, CA (US); Bernd Huebner, Mountain View, CA (US)

(73) Assignee: II-VI Delaware Inc., Wilmington, DE (US)

( * ) Notice: Subject to any disclaimer, the term of this patent is extended or adjusted under 35 U.S.C. 154(b) by 0 days.

(21) Appl. No.: 16/212,355

(22) Filed: Dec. 6, 2018

(65) Prior Publication Data
US 2019/0170941 A1 Jun. 6, 2019

Related U.S. Application Data

(60) Provisional application No. 62/595,463, filed on Dec. 6, 2017.

(51) Int. Cl.
| | |
|---|---|
| *G02B 6/12* | (2006.01) |
| *G02B 6/122* | (2006.01) |
| *G02B 6/30* | (2006.01) |

(52) U.S. Cl.
CPC ....... *G02B 6/1228* (2013.01); *G02B 6/12002* (2013.01); *G02B 6/12004* (2013.01); *G02B 6/305* (2013.01); *G02B 6/1223* (2013.01); *G02B 2006/12061* (2013.01); *G02B 2006/12147* (2013.01)

(58) Field of Classification Search
CPC .................................................. G02B 6/1228
See application file for complete search history.

(56) References Cited

U.S. PATENT DOCUMENTS

| | | | |
|---|---|---|---|
| 6,253,009 B1 * | 6/2001 | Lestra ................. | G02B 6/1228 257/E31.127 |
| 7,050,681 B2 * | 5/2006 | Blauvelt ............ | G02B 6/12002 385/28 |
| 7,158,702 B2 * | 1/2007 | Blauvelt ............ | G02B 6/12002 385/28 |
| 7,164,825 B2 * | 1/2007 | Blauvelt ............ | G02B 6/12002 385/28 |

(Continued)

OTHER PUBLICATIONS

International Search Report and Written Opinion dated Mar. 15, 2019, in related PCT Application No. PCT/US2018/064329.

(Continued)

*Primary Examiner* — Peter Radkowski
(74) *Attorney, Agent, or Firm* — Maschoff Brennan

(57) ABSTRACT

In an example, a photonic system and method include a photonic integrated circuit (PIC) including a silicon (Si) waveguide and a first silicon nitride (SiN) waveguide. The system also includes an interposer including a second SiN waveguide including vertical tapers on the second SiN waveguide by increasing a thickness of the second SiN waveguide in a direction toward the first SiN waveguide to allow an adiabatic optical mode transfer and decreasing the thickness of the second SiN waveguide in a direction away from the first SiN waveguide to inhibit the optical mode transfer.

13 Claims, 17 Drawing Sheets

(56) References Cited

U.S. PATENT DOCUMENTS

| | | | | |
|---|---|---|---|---|
| 7,164,838 | B2* | 1/2007 | Blauvelt | G02B 6/12002 385/131 |
| 7,184,643 | B2* | 2/2007 | Blauvelt | G02B 6/12002 385/129 |
| 7,218,809 | B2* | 5/2007 | Zhou | G02B 6/1228 385/28 |
| 7,577,327 | B2* | 8/2009 | Blauvelt | G02B 6/12002 385/129 |
| 7,783,146 | B2* | 8/2010 | Blauvelt | G02B 6/12002 385/30 |
| 7,792,403 | B1* | 9/2010 | Little | G02B 6/1228 385/11 |
| 7,853,103 | B2* | 12/2010 | Blauvelt | G02B 6/12002 349/187 |
| 7,885,499 | B2* | 2/2011 | Blauvelt | G02B 6/12002 385/30 |
| 8,170,383 | B2* | 5/2012 | Tokushima | G02B 6/1228 385/14 |
| 8,472,766 | B2* | 6/2013 | Spector | G02B 6/136 257/E33.067 |
| 8,855,449 | B1* | 10/2014 | Roth | G02B 6/2773 385/11 |
| 9,268,089 | B2* | 2/2016 | Heideman | G02B 6/1228 |
| 9,405,066 | B2* | 8/2016 | Mahgerefteh | G02B 6/124 |
| 9,563,014 | B2* | 2/2017 | Pan | G02B 6/305 |
| 9,874,691 | B2* | 1/2018 | Mahgerefteh | G02B 6/124 |
| 9,939,582 | B2* | 4/2018 | Heideman | G02B 6/1228 |
| 10,001,599 | B2* | 6/2018 | Park | G02B 6/124 |
| 10,132,997 | B2* | 11/2018 | Mahgerefteh | G02B 6/2726 |
| 10,261,251 | B2* | 4/2019 | Mahgerefteh | G02B 6/124 |
| 10,317,621 | B2* | 6/2019 | Mahgerefteh | G02B 6/12014 |
| 10,317,632 | B2* | 6/2019 | Mahgerefteh | H01S 5/02252 |
| 2003/0044118 | A1* | 3/2003 | Zhou | G02B 6/1228 385/43 |
| 2004/0037497 | A1 | 2/2004 | Lee | |
| 2006/0062521 | A1* | 3/2006 | Zhou | G02B 6/1228 385/43 |
| 2007/0274654 | A1* | 11/2007 | Choudhury | G02B 6/1228 385/131 |
| 2008/0273567 | A1* | 11/2008 | Yariv | G02B 6/12 372/50.1 |
| 2009/0297093 | A1* | 12/2009 | Webster | G02B 6/1228 385/14 |
| 2010/0067846 | A1* | 3/2010 | Tokushima | G02B 6/1228 385/14 |
| 2011/0170825 | A1* | 7/2011 | Spector | G02B 6/1228 385/43 |
| 2014/0286616 | A1* | 9/2014 | Heideman | G02B 6/1228 385/131 |
| 2015/0285997 | A1* | 10/2015 | Pan | G02B 6/305 385/28 |
| 2015/0316720 | A1* | 11/2015 | Yang | G02B 6/305 385/14 |
| 2016/0131837 | A1* | 5/2016 | Mahgerefteh | G02B 6/124 385/14 |
| 2016/0131842 | A1* | 5/2016 | Mahgerefteh | G02B 6/124 385/11 |
| 2016/0246003 | A1* | 8/2016 | Heideman | G02B 6/1228 |
| 2016/0327742 | A1 | 11/2016 | Collins et al. | |
| 2017/0052317 | A1* | 2/2017 | Mahgerefteh | G02B 6/124 |
| 2017/0329081 | A1* | 11/2017 | Mahgerefteh | G02B 6/2726 |
| 2017/0363808 | A1* | 12/2017 | Mahgerefteh | G02B 6/124 |
| 2018/0156992 | A1* | 6/2018 | Mahgerefteh | H01S 5/02252 |
| 2018/0217330 | A1* | 8/2018 | Mahgerefteh | G02B 6/12014 |
| 2019/0109649 | A1* | 4/2019 | Denoyer | H04B 10/671 |
| 2019/0129096 | A1* | 5/2019 | Mahgerefteh | G02B 6/2726 |

OTHER PUBLICATIONS

Mu et al., "Low-loss, broadband and high fabrication tolerant vertically tapered optical couplers for monolithic integration of Si3N4 and polymer waveguides," Optics Letters, vol. 42, 3812-3815 (2017).

Shiraishi et al., "A silicon-based spot-size converter between single-mode fibers and Si-wire waveguides using cascaded tapers,", Applied Physics Letters, vol. 91, (2007).

* cited by examiner

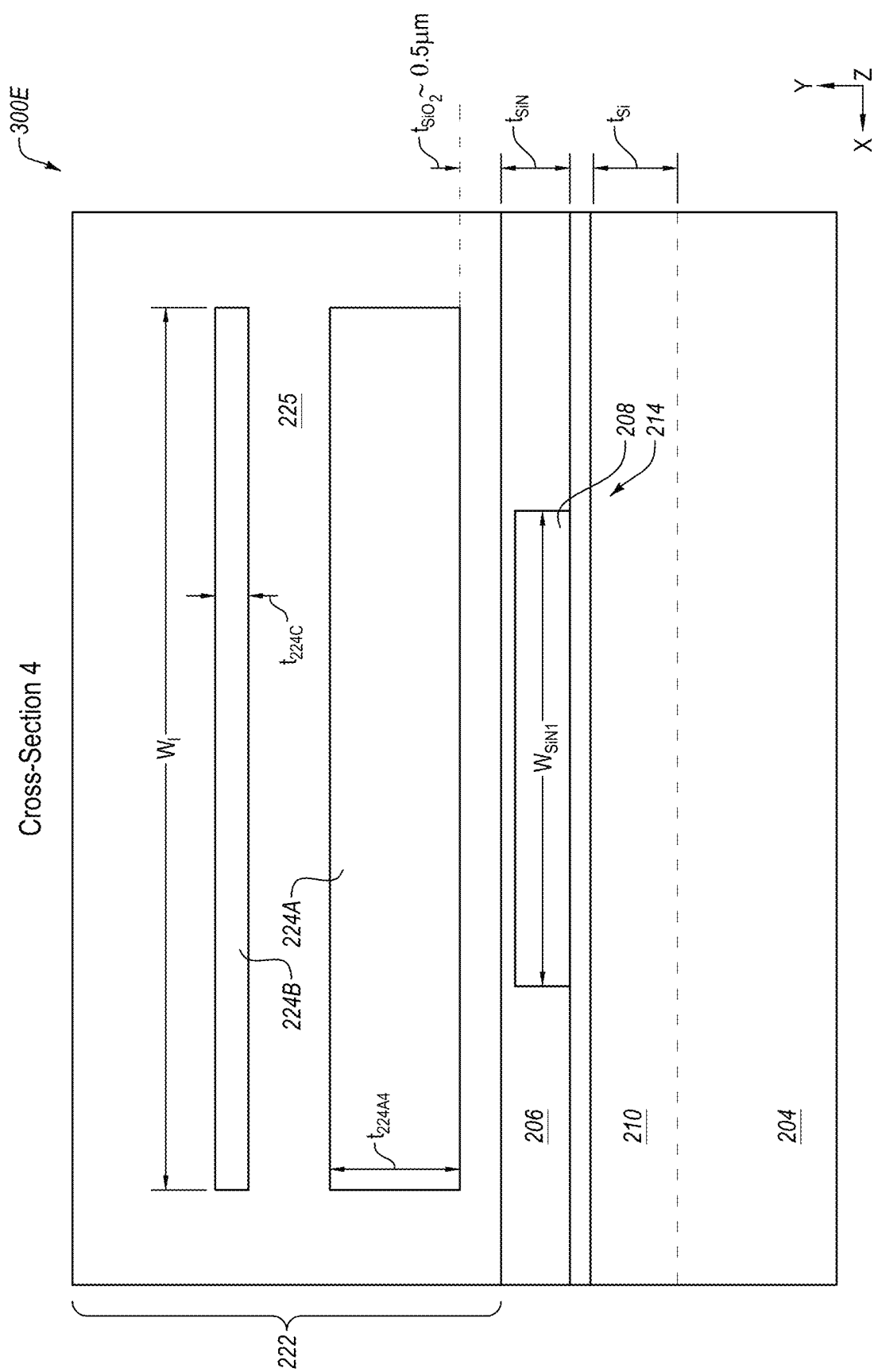

ADIABATICALLY COUPLED PHOTONIC SYSTEMS WITH VERTICALLY TAPERED WAVEGUIDES

CROSS-REFERENCE TO RELATED APPLICATION

This application claims the benefit of and priority to U.S. Provisional Patent Application No. 62/595,463 filed on Dec. 6, 2017, which is incorporated herein by reference.

FIELD

The embodiments discussed herein are related to multi-stage adiabatically coupled photonic systems.

BACKGROUND

Unless otherwise indicated herein, the materials described herein are not prior art to the claims in the present application and are not admitted to be prior art by inclusion in this section.

One common solution to couple light into or out of a silicon (Si) photonic integrated circuit (PIC) includes a planar or edge coupler. Edge coupling from an edge of the Si PIC may be implemented to couple light into or out of the Si PIC. However, the edge coupling may require component profiles that may be susceptible to variations due to fabrication tolerances resulting in unacceptable efficiencies.

The subject matter claimed herein is not limited to implementations that solve any disadvantages or that operate only in environments such as those described above. Rather, this background is only provided to illustrate one example technology area where some implementations described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to two-stage adiabatically coupled photonic systems.

In an example embodiment, a photonic system includes a photonic integrated circuit (PIC) including a silicon (Si) waveguide and a first silicon nitride (SiN) waveguide. The photonic system may further include an interposer including a second SiN waveguide including vertical tapers on the second SiN waveguide by increasing a thickness of the second SiN waveguide in a direction toward the first SiN waveguide to allow an optical mode transfer and decreasing the thickness of the second SiN waveguide in a direction away from the first SiN waveguide to inhibit the optical mode transfer.

The Si waveguide may include a second lateral taper to allow an optical mode transfer from the Si waveguide to the first SiN waveguide. Further, the first SiN waveguide may include a first lateral taper to allow an optical mode transfer from the first SiN waveguide to the second SiN waveguide. The vertical taper on the second SiN waveguide of the interposer may decrease in thickness away from the first SiN waveguide of the PIC to disallow the optical mode transfer from the first SiN waveguide of the second SiN waveguide.

In another example embodiment, a photonic system may include a silicon (Si) waveguide including a first lateral taper on a terminal end, the Si waveguide configured to propagate an optical signal in an optical mode. The system may also include a first silicon nitride (SiN) waveguide including a non-tapered portion configured to adiabatically optically couple the optical signal from the lateral taper of the Si waveguide, the first SiN waveguide further including a second lateral taper on a terminal end. The system may further include a second SiN waveguide including a first vertical taper to increase a thickness of the second SiN waveguide configured to adiabatically optically couple the optical signal from the first SiN waveguide to the second SiN waveguide, the second SiN waveguide further including a second vertical taper to decrease the thickness of the second SiN waveguide inhibiting optical coupling with the first SiN waveguide.

The system may yet further include a third SiN waveguide configured to optically couple the signal from the second SiN waveguide. Further, the Si waveguide and the first SiN waveguide may be configured as part of a photonic integrated circuit (PIC) and the second SiN waveguide and the third SiN waveguide are configured as part of an interposer for coupling with the PIC. Also, the second SiN waveguide and the third SiN waveguide may include portions configured to exhibit a low-contrast for fiber coupling of the optical signal to a fiber. The second SiN waveguide vertically may taper between a thickness of about 20 nm to about 250 nm. The second SiN waveguide and the third SiN waveguide may be separated by a distance of about 1 μm.

In yet another embodiment, a method includes propagating an optical signal in a silicon (Si) waveguide including a first laterally tapered end. Also, the method may include firstly optically coupling the optical signal from the first laterally tapered end of the Si waveguide to a first silicon nitride (SiN) waveguide including a second laterally tapered end. Further, the method may include secondly optically coupling the optical signal from the second laterally tapered end of the first SiN waveguide to a third SiN waveguide in response to the second SiN waveguide being vertically tapered to an increased thickness near the second laterally tapered end of the first SiN waveguide.

Also, the method may further include thirdly optically coupling the optical signal from the second SiN waveguide to a third SiN waveguide in response to the second SiN waveguide being vertically tapered to a decreased thickness away from the first SiN waveguide. Also, the second SiN waveguide and the third SiN waveguide may be high-contrast with the second SiN waveguide having a thickness of about 250 nm and the third SiN waveguide having a thickness of about 20 nm and separated by a distance of about 1 μm.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings.

FIGS. 3A-3G include various views of portions of the photonic system of FIGS. 1 and 2.

DETAILED DESCRIPTION OF SOME EXAMPLE EMBODIMENTS

Figure 1:
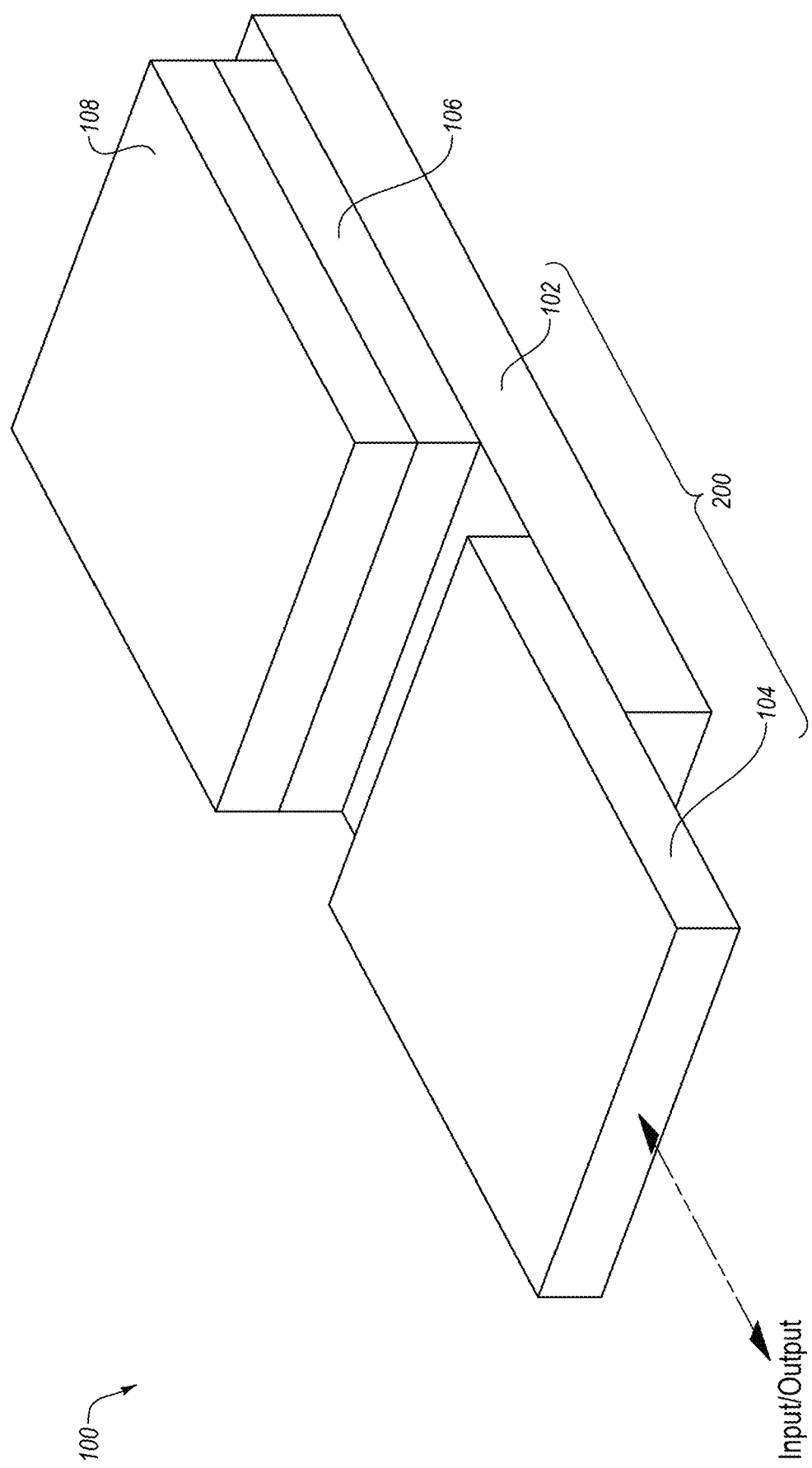
FIG. 1 is a perspective view of an example optoelectronic system (hereinafter "system").

Some embodiments described herein generally relate to adiabatic coupling of light from a silicon (Si) waveguide to an intermediate silicon nitride ($Si_xN_y$, generically referred to herein as SiN) waveguide and then from the SiN waveguide to an interposer waveguide (e.g., polymer or high-index glass waveguide), or vice versa. For ease of reference in the discussion that follows, the adiabatic coupling is often discussed in the context of a single Si waveguide-to-SiN waveguide-to-interposer waveguide coupling with the understanding that multiple such couplings may be included in a given system.

The Si waveguide may have a first optical mode size, a first SiN waveguide may have a second optical mode size substantially larger than the first optical mode size, and an interposer waveguide may have a third optical mode size substantially larger than the second mode size. For example, the first optical mode size may be about 0.3 μm, or in a range between 0.25 μm and 0.5 μm; the second optical mode size may be about 1 μm, or in a range between 0.7 μm and 3 μm; and the third optical mode size may be about 10 μm, or in a range between 8 μm and 12 μm. The third optical mode size may be substantially similar to an optical mode size of a standard single mode optical fiber. For example, a standard single mode optical fiber may have an optical mode size of about 10 μm, which is substantially similar to the third optical mode size.

The Si waveguide may be inverse tapered to a width of about 80 nanometers (nm) to increase a size of the light mode and bring it out into a cladding of the Si waveguide. The first SiN waveguide may be fabricated on a Si photonic integrated circuit (PIC) that includes the Si waveguide. The first SiN waveguide may receive the light from the Si inverse taper. Similar to the Si waveguide, the first SiN waveguide may be inverse tapered to a width of 80-300 nm. The interposer waveguides, including second and third SiN waveguides, with approximately a 1 μm core may be placed in close optical contact with the first SiN waveguide. Light from the Si waveguide inverse taper may be adiabatically coupled to the first SiN waveguide and then to the interposer including the second and third SiN waveguides in steps along the direction of propagation and may be completely or substantially completely translated to it. The interposer waveguides may be processed on a separate rigid or flexible substrate and may be attached to the first SiN waveguide using various techniques including thermo-mechanical attachment, or by use of index matching adhesive. The Si PIC may include modulators, waveguides, detectors, couplers, and other optical components in a Si on Insulator (e.g., silicon on silicon dioxide ($SiO_2$) box layer) on Si substrate. An integrated circuit (IC) may be flip chip bonded (e.g., by a copper pillar) on the Si PIC in a portion of the Si PIC away from a coupling region where the first SiN waveguide and interposer with the second and third SiN waveguides may be located. The interposer waveguides may be included in an interposer that may be transparent and/or that may have alignment marks to allow ease in optical alignment of the first SiN waveguide on the Si PIC with the interposer waveguides on the interposer. The interposer waveguides including the second and third SiN waveguides and the first SiN waveguide can be aligned either passively or actively.

The first SiN waveguide may be defined in a fabrication process of the Si PIC to which a $SiN/SiO_2$ layer section is added for coupling and passive functions. A standard Si photonic stack layer has a Si substrate, $SiO_2$ oxide layer (called BOX or $SiO_2$ box), and Si waveguide layer in which Si waveguides are surrounded by $SiO_2$ cladding to confine the light. Embodiments described herein may add a first SiN layer to this standard stack for two stage coupling and optionally passive optical functions. The first SiN layer has regions of SiN core waveguides surrounded by $SiO_2$ cladding to confine the light. SiN has an intermediate index of refraction between indexes of refraction of Si and polymer and so allows efficient adiabatic coupling between the two layers with taper widths that are within critical dimensions of some standard complementary metal-oxide-semiconductor (CMOS) fabs. The low loss of SiN and the lower core/cladding index difference of SiN relative to $SiO_2$ cladding compared to that of Si and $SiO_2$ allows fabrication of passive components with better performance. For example wavelength division multiplexers (WDM mux) and demultiplexers (WDM demux) in SiN have higher channel isolation than in Si. In addition, passive components in SiN have a 5× smaller drift of peak wavelengths with temperatures relative to the same in Si.

In some embodiments, transmit (TX) and receive (RX) Si waveguides on the Si PIC may be in one plane or accessible at one planar interface of the Si PIC whereas an MT connector for parallel single mode fibers can have configurations by multisource agreement (MSA) in which a TX array is in one row and an RX array is in a row below it. It may also be possible for both TX and RX to be in the same row but separated. Embodiments described herein include an interposer that can connect from the first SiN waveguide inputs/outputs in a plane of the Si PIC and present to, e.g., an MT connector, two vertically separated rows of inputs/outputs.

In some embodiments, wavelength division multiplexing or other passive optical functions may be integrated in a same $SiN/SiO_2$ layer in which the first SiN waveguide is formed. Use of the $SiN/SiO_2$ layer may be advantageous as compared to implementing such optical functions in other layers and/or materials in that it may provide lower loss, better channel isolation due to lower loss in SiN and smaller index difference between core and cladding.

Some embodiments described herein may be wavelength independent over a range of operation. For instance, some embodiments described herein may be wavelength independent over a range of operation of 1310 nm standard long reach (LR) standards, whereas surface grating couplers may have a relatively narrow 20-30 nm pass band.

In some embodiments, light propagating from the Si waveguide to the first SiN waveguide to the interposer including the second and third SiN waveguides may go from the Si waveguide down to the first SiN waveguide and then up into the interposer including the second and third SiN waveguides, where it may then be coupled into an optical fiber or the like, or light may travel on the reverse path. In these and other embodiments, the interposer waveguides can include polymer or high-index glass waveguides having a similar cladding refractive index near 1.5.

In the discussion that follows, numerous embodiments are disclosed. The various embodiments are not mutually exclusive unless context dictates otherwise. For instance, a portion or all of one or more embodiments may be combined with a portion or all of one or more other embodiments unless context dictates otherwise.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1 is a perspective view of an example optoelectronic system 100 (hereinafter "system 100"), arranged in accordance with at least one embodiment described herein. As illustrated, the system 100 includes a Si PIC 102, an interposer 104, a three-dimensional (3D) stack region 106, and a flip chip bonded integrated circuit (IC) 108. The Si PIC 102 and the interposer 104 together form a two-stage adiabatically coupled photonic system 200 (hereinafter "photonic system 200").

In general, the Si PIC 102 may include one or more optical elements, such as a modulator, waveguide, coupler, or other optical element(s) in a Si-on-insulator substrate.

In general, the 3D stack region 106 may provide electrical connections to one or more active optical components of the Si PIC 102. Accordingly, the 3D stack region 106 may include, e.g., metallized pillars, traces, and/or contacts as well as insulative dielectric and/or other materials and elements.

In general, the flip chip bonded IC 108 may include one or more active and/or passive electrical devices that may be communicatively coupled through the 3D stack region 106 to the one or more active optical components of the Si PIC 102.

The interposer 104 may be mechanically coupled to the Si PIC 102, or may be integrally formed using layer deposition to the SiPIC 102. An interposer SiN waveguide of the interposer 104 and a SiN waveguide and Si waveguide of the Si PIC 102 may be configured to adiabatically couple light into or out of the Si PIC 102. As used herein, light may be adiabatically coupled from one optical component or device, herein called the 'initial state' waveguide to another, herein called the final state waveguide, in a transitional interaction region, sometimes referred to herein as an adiabatic coupler region. To transfer optical power from the initial state waveguide to the final state waveguide one or more optical properties of either or both initial and final state waveguides, such as width, height, effective refractive index, etc., are varied along the optical axis. Herein the initial state and final state waveguides form one system within the transitional interaction region and light remains in a single mode of the joint system while it physically gets transferred from the initial state waveguide to the final state waveguide. The initial state and final state waveguides may respectively correspond to the Si waveguide and the SiN waveguide, or vice versa. Alternatively or additionally, the initial and final state waveguides may respectively correspond to the SiN waveguide and the interposer waveguide, or vice versa. Alternatively or additionally, two components may be said to be adiabatically coupled together or to each other when the two components are configured as described herein to form an adiabatic coupler region.

Moreover, light is used generically herein to refer to electromagnetic radiation of any suitable wavelength, and may include light with wavelengths of, e.g., about 800-900 nm, 1200-1360 nm, 1360-1460 nm, 1530-1565 nm, or other suitable wavelengths. Light can also have TE or TM polarization.

In these and other implementations, the SiN waveguide in the Si PIC 102 may be aligned with and optically coupled to the SiN waveguide in the interposer 104. Additionally, the interposer waveguide in the interposer 104 may be aligned with and optically coupled to the SiN waveguide in the Si PIC 102. The Si waveguide may have a first index of refraction n1. The SiN waveguide may have a second index of refraction n2. The interposer SiN waveguide may have a third index of refraction n3. In general, the second index of refraction n2 of the SiN waveguide may be intermediate between the first index of refraction n1 of the Si waveguide and the third index of refraction n3 of the interposer SiN waveguide. In addition, n1>n2>n3. In some embodiments, for a two-stage adiabatically coupled photonic system with three waveguides, each with a corresponding one of the indexes of refraction n1, n2, n3, the first index of refraction n1 may be in a range of 3 to 3.5, the second index of refraction n2 may be in a range of 1.8 to 2.2, and the third index of refraction n3 may be in a range of 1.49 to 1.6.

The interposer SiN waveguide in the interposer 104 may additionally be aligned with and optically coupled to an input and/or output for one or more optical signals. An example input source may include an optical signal source (e.g., a laser), an optical fiber, a fiber end connector, a lens, or other optical component or device from which incoming optical signals (e.g., signals coming toward the Si PIC 102) are provided to the interposer 104 for input to the Si PIC 102. An example output device to which output may be sent may include a laser, an optical receiver (e.g., a photodiode), an optical fiber, a fiber end connector, a lens, or other optical component or device to which outgoing signals (e.g., signals leaving the Si PIC 102) may be provided through the interposer 104. One or more of the active optical components of the Si PIC 102 may generate or otherwise be the source of outgoing signals that are outputted from the photonic system 200 through the Si waveguide, the SiN waveguide, and the interposer waveguide. Alternately or additionally, one or more of the active optical components of the Si PIC 102 may be configured to receive and process incoming signals that are inputted to the photonic system 200 through the interposer waveguide, the SiN waveguide, and the Si waveguide.

Figure 2:
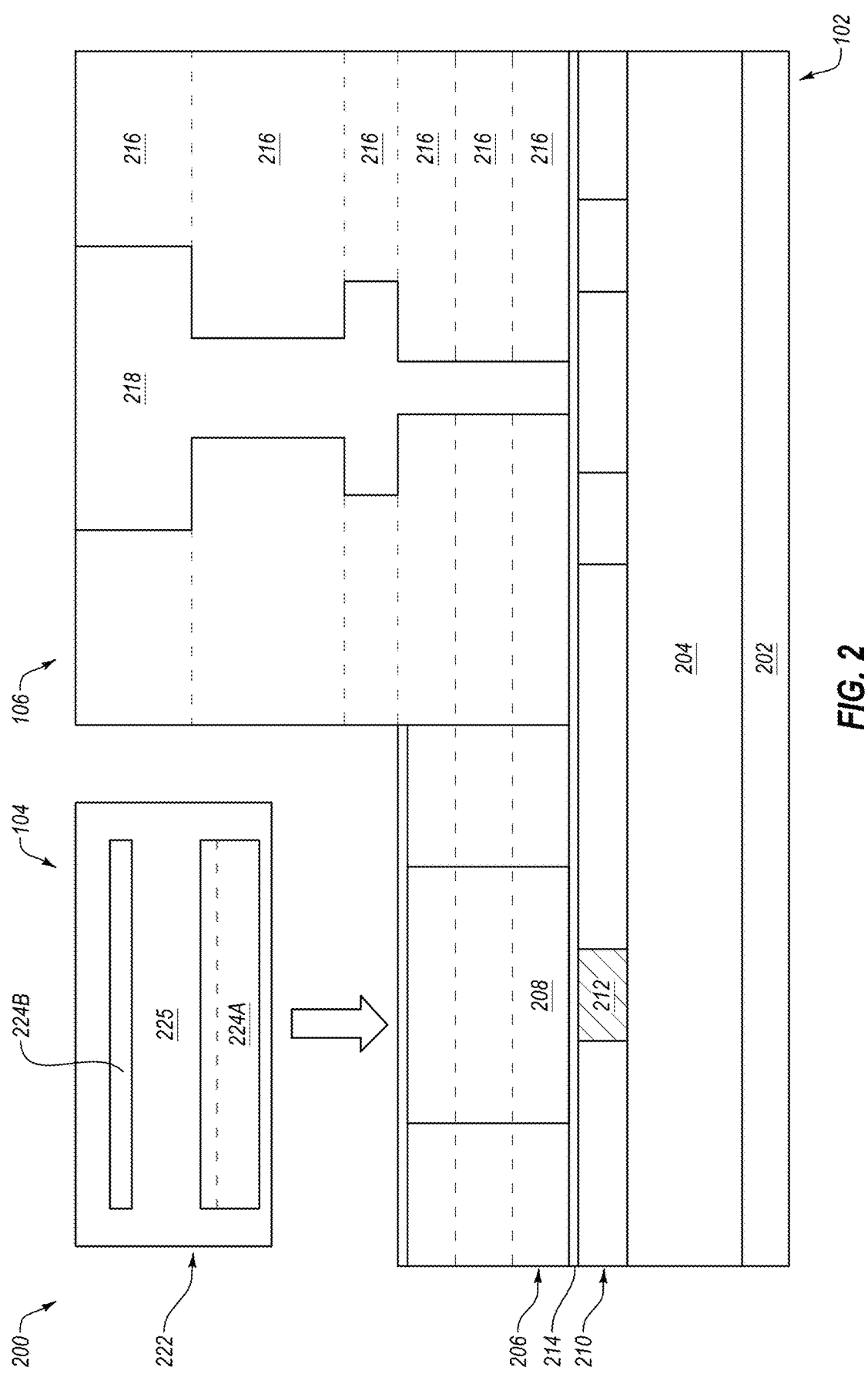
FIG. 2 is a side view of an example two-stage adiabatically coupled photonic system (hereinafter "photonic system") of FIG. 1.

FIG. 2 is a side view of the photonic system 200 of FIG. 1, arranged in accordance with at least one embodiment described herein. The photonic system 200 includes the Si PIC 102 and the interposer 104. FIG. 2 additionally illustrates the 3D stack region 106.

The Si PIC 102 includes a Si substrate 202, a $SiO_2$ box 204, a first layer 206 that includes one or more SiN waveguides 208, and a second layer 210 that includes one or more Si waveguides 212. In the illustrated embodiment, the first and second layer 206 and 210 are both formed above the $SiO_2$ box 204. In particular, the first layer 206 is formed on (or at least above) the second layer 210 and the second layer 210 is formed on (or at least above) the $SiO_2$ box 204. Alternatively or additionally, a slab 214 of SiN may be formed between the first layer 206 and the second layer 210 at least in a region where the Si waveguide 212 is optically coupled to the first SiN waveguide 208. In an example embodiment, the first SiN waveguide 208 includes $Si_3N_4$ as the waveguide core surrounded on at least two sides along its length by $SiO_2$ or other suitable waveguide cladding.

Although not illustrated in FIG. 2, the Si PIC 102 may further include one or more active optical components formed in the second layer 210. In these and other embodiments, the Si PIC 102 may further include one or more dielectric layers 216 formed on and/or above the second layer 210, and one or more metallized structures 218 formed in the dielectric layers 216. The metallized structures 218 may extend from a top of the Si PIC 102 through the dielectric layers 216 to electrically contact with the active optical components formed in the second layer 210 or elsewhere in the Si PIC 102. The dielectric layers 216 may include $SiO_2$ or other suitable dielectric material. The dielectric layers 216 and the metallized structures 218 are collectively an example of the 3D stack region 106.

With combined reference to FIGS. 1 and 2, the flip chip bonded IC 108 may be flip chip bonded to the 3D stack region 106. The flip chip bonded IC 108 may include one or more active and/or passive electrical devices that may be communicatively coupled through the 3D stack region 106 to the one or more active optical components formed in the second layer 210 of the Si PIC 102.

The interposer 104 may include a waveguide strip 222 comprised of one or more interposer waveguides 224. Each waveguide strip 222 includes a first interposer core waveguide, identified herein as a second SiN waveguide 224A, an interposer cladding 225 of different indexes of refraction, and a second interposer core waveguide, identified herein as a third SiN waveguide 224B. A coupler portion of the second SiN waveguide 224A of the interposer may be disposed above a laterally tapered end of the first SiN waveguide 208 in the first layer 206 and is aligned with the laterally tapered end of the first SiN waveguide 208, as described in more detail below.

The Si waveguide 212 (or more particularly, the core of the Si waveguide 212) may have the first index of refraction $n_1$ mentioned above. The SiN waveguide 208 (or more particularly, the core of the SiN waveguide 208) may have the second index of refraction $n_2$ mentioned above. The interposer waveguide strip 222 (or more particularly, the second SiN waveguide 224A and the third SiN waveguide 224B) may have the third index of refraction $n_3$ mentioned above, where $n_1 > n_2 > n_3$. The spatial separation of the interposer 104 from the SiPIC 102 in FIG. 2 is illustrative of separate functional entities as, in at least one embodiment, the interposer 104 may be formed directly onto the Si PIC 102 using, for example, deposition processes.

FIGS. 3A-3G include various views of portions of the photonic system 200 of FIG. 2, arranged in accordance with at least one embodiment described herein. In particular, FIG. 3A includes an overhead view 300A and a longitudinal cross-sectional view 300B and FIG. 3B includes transverse cross-sectional views 300C-300H at some locations respectively denoted by reference lines 1-8 in FIG. 3A.

Figure 3A:
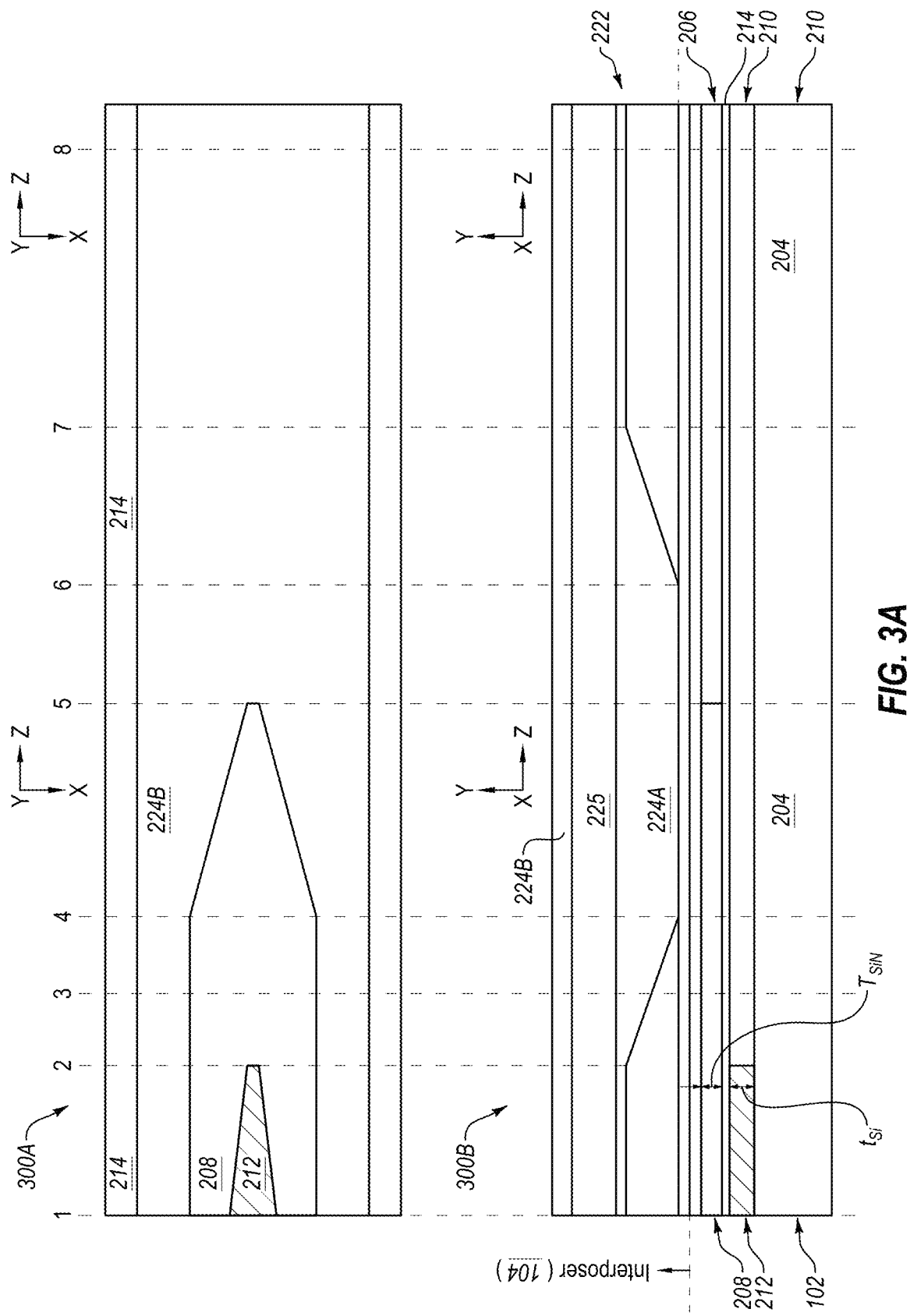

The overhead view 300A of FIG. 3A illustrates relative x-axis and z-axis alignment of various components with respect to each other according to an arbitrarily defined x-y-z coordinate axis provided within each of the views 300A-300B of FIG. 3A and provided in other Figures herein. A single instance of the x-y-z coordinate axis is provided for all views 300C-300H of FIG. 3B since all views 300C-300H have the same orientation. The x direction may sometimes be referred to as a lateral or transverse direction and terms such as width, lateral, transverse, side, sideways etc., may be used to refer to, e.g., dimensions, relative position, and/or movement in the x direction unless context dictates otherwise. The y direction may sometimes be referred to as a vertical direction and terms such as height, thickness, vertical, vertically, above, below, up, down, etc. may be used to refer to, e.g., dimensions, relative position, and/or movement in the y direction unless context dictates otherwise. The z direction may sometimes be referred to as a longitudinal or light-propagating direction and terms such as length, longitudinal, upstream, downstream, forward, backward, front, back, etc., may be used to refer to, e.g., dimensions, relative position, and/or movement in the z direction unless context dictates otherwise.

The longitudinal cross-sectional view 300B of FIG. 3A illustrates an example material stack up for the various components. The overhead view 300A of FIG. 3A includes outlines or footprints of the various components at different levels in the material stack up that may not necessarily be visible when viewed from above, but are shown as outlines or footprints to illustrate the x and z alignment of the various components with respect to each other.

The portion of the photonic system 200 illustrated in the overhead view 300A of FIG. 3A includes a tapered end of the Si waveguide 212. The tapered end of the Si waveguide 212 is relatively wider at reference line 1 than at reference line 2. The tapered end of the Si waveguide 212 may be considered to have a taper or an inverse taper, which are structurally equivalent. As used herein, a waveguide such as the Si waveguide 212 of FIG. 3A may be considered to have a taper with respect to outgoing optical signals, e.g., optical signals that enter the waveguide at a relatively wider portion of the waveguide and propagate through the waveguide towards a relatively narrower portion of the waveguide. In comparison, a waveguide such as the Si waveguide 212 of FIG. 3A may be considered to have an inverse taper with respect to incoming optical signals, e.g., optical signals that propagate through the waveguide in the direction from narrower to wider to exit the waveguide. For simplicity in the discussion that follows, the term "taper" and its variants should be broadly construed as a variation of the waveguide width along the optical axis. In some embodiments, it may be advantageous to vary the width of the waveguide along the optical axis linearly or nonlinearly or in segments of linear and nonlinear variation. The width of the taper around the interaction region of the initial state and final state waveguides may be varied to optimize coupling or reduce the length of the coupling region to produce a physically smaller device.

The Si waveguide 212, including the tapered end, may be formed in the second layer 210 and positioned below the first layer 206 that includes the first SiN waveguide 208. For example, the second layer 210 may be positioned below the SiN slab 214, which in turn is positioned below the first layer 206. Within the second layer 210, $SiO_2$ may generally be disposed adjacent to sides of the Si waveguide 212 (e.g., in the positive x and negative x directions), as illustrated in the views 300C of FIG. 3B, to form a cladding for the Si waveguide 212, which serves as the core. In some embodiments, the Si waveguide 212 and/or other Si waveguides of the Si PIC 102 may have a thickness $t_{Si}$ (e.g., in the y direction) of approximately 0.3 μm and an index of refraction of about 3.4. The specific values of indexes of refraction, thickness, width, length, and other values provided herein are provided by way of example only and values other than those explicitly stated may nevertheless fall within the scope of the described embodiments.

As illustrated in FIG. 3A, the SiN slab 214 may be formed or otherwise located on the second layer 210 that includes the Si waveguide 212. The SiN slab 214 may have a thickness (e.g., in the y direction) of approximately 0-50 nm in some embodiments.

The view 300B of FIG. 3A further illustrates the first SiN waveguide 208. The first SiN waveguide 208 includes both a coupler portion and a tapered end. The coupler portion of the first SiN waveguide 208 generally includes the portion of the first SiN waveguide 208 between reference lines 1 and 3 and the tapered end of the first SiN waveguide 208 generally includes the portion of the first SiN waveguide 208 between reference lines 4 and 5. The tapered end of the first SiN waveguide 208 is relatively wider at reference line 4 than at reference line 5.

Figure 3B:
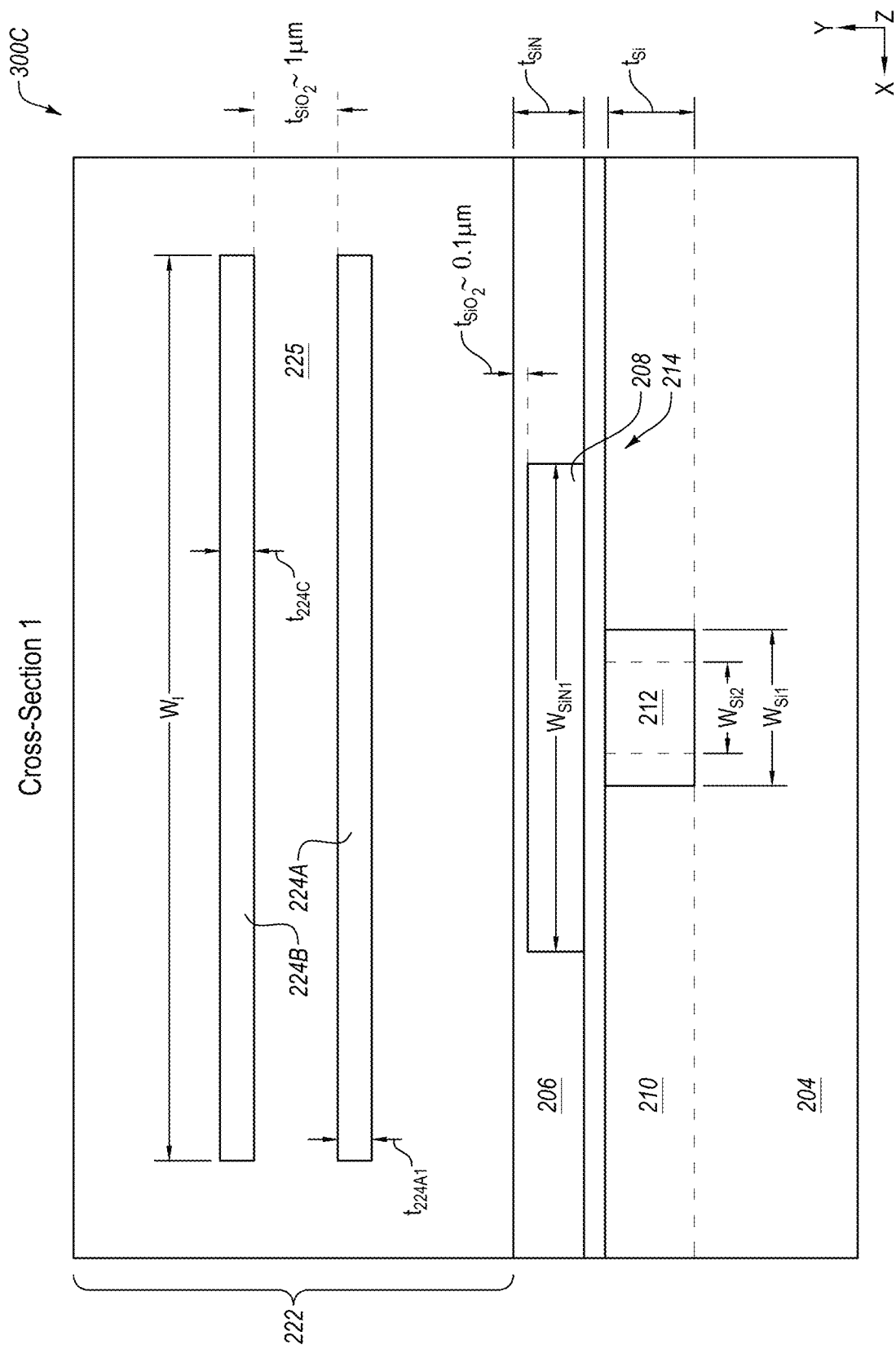
Figure 3C:
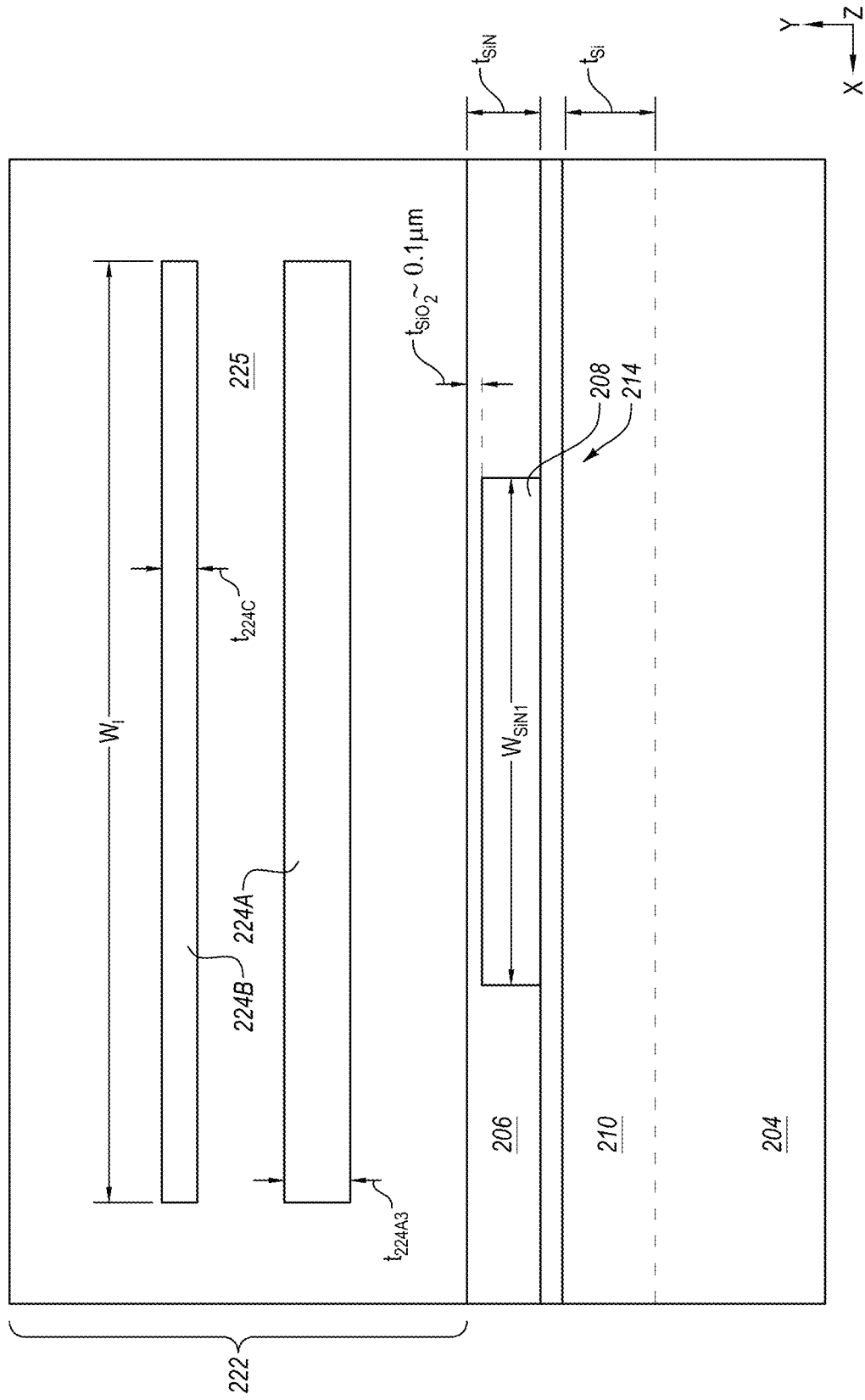
Figure 3E:
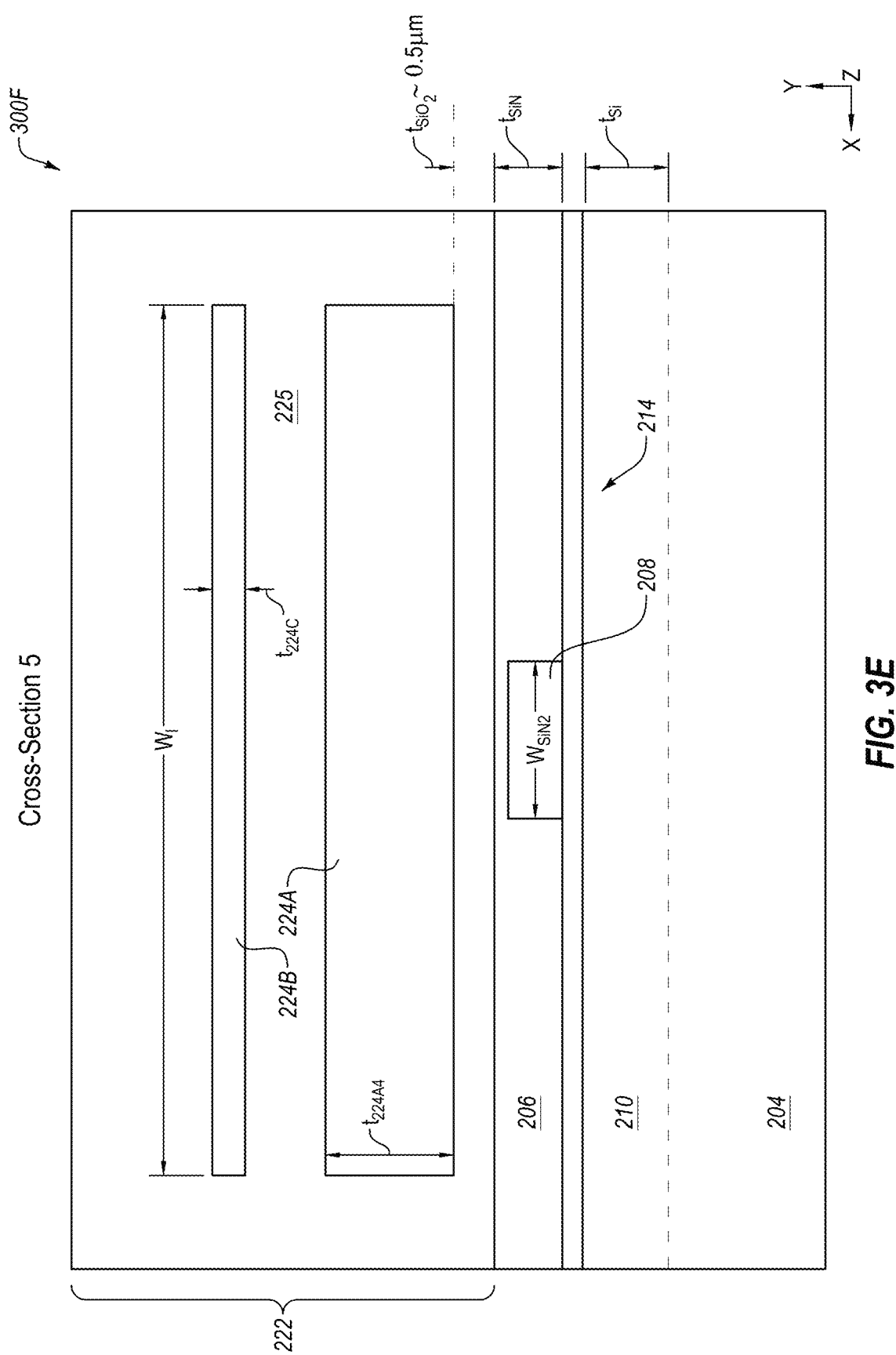
Figure 3F:
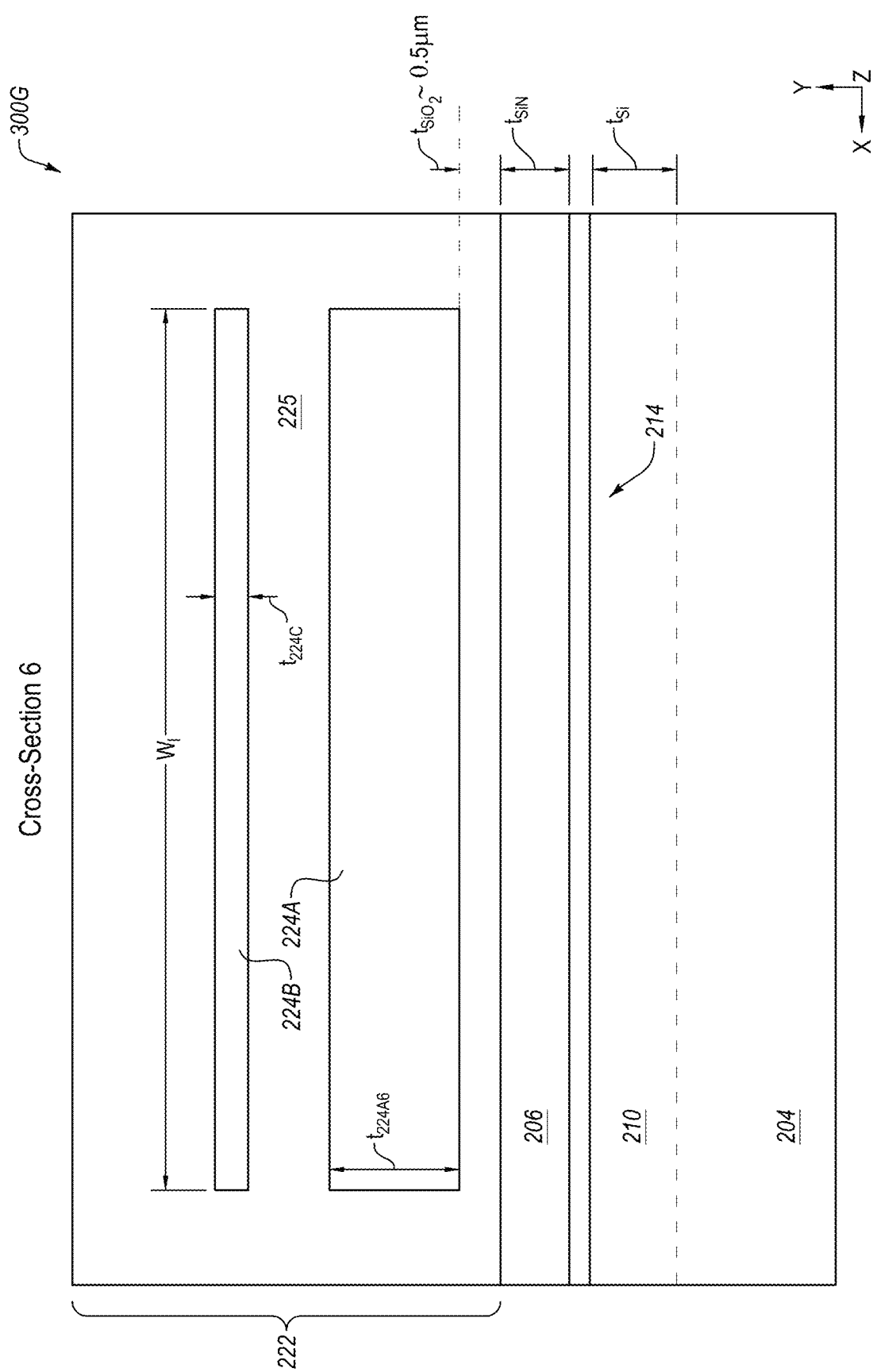

Within the first layer 206, $SiO_2$ may generally be disposed adjacent to sides of the first SiN waveguide 208 (e.g., in the positive x and negative x directions), to serve as a cladding layer for the first SiN waveguide 208, as illustrated in the views 300C of FIGS. 3B through 300F of FIG. 3E. In some embodiments, the first SiN waveguide 208 and/or other SiN waveguides of the first layer 206 may have a thickness (e.g., in the z direction) of approximately 0.5-1 μm and an index of refraction of about 1.99.

It can be seen from FIG. 3A that, although the first SiN waveguide 208 is displaced in the y direction from the Si waveguide 212, the tapered end of the Si waveguide 212 may be aligned in the x and z directions with the coupler portion (substantially between reference lines 1 and 2) of the first SiN waveguide 208 such that the tapered end of the Si waveguide 212 establishes the coupler portion of the SiN waveguide 208 (as seen in the view 300A) in the x and z directions and is parallel thereto (as seen in the view 300B).

FIG. 3A additionally illustrates interposer waveguide strip 222. The interposer waveguide strip 222 includes the second SiN waveguide 224A, cladding 225, and the third SiN waveguide 224B. Additionally, the second SiN waveguide 224A includes a first vertically tapered portion (substantially between reference lines 2 and 4), a high-contrast coupler portion (substantially between reference lines 4 and 6), a second vertically tapered portion (substantially between reference lines 6 and 7), and a low-contrast fiber coupler portion (substantially extending beyond reference line 7).

The photonic system 200 includes a first optical mode portion generally located to the left of reference line 1 where an optical signal propagates by optical mode in the Si waveguide 212. The photonic system 200 includes a first coupler portion in the PIC 102 generally located between reference lines 1 and 2 where an optical mode of the optical signal in the Si waveguide 212 is transferred to the first SiN waveguide 208. The photonic system 200 includes a second coupler portion generally located between reference lines 4 and 5 where an optical mode of the optical signal in the first SiN waveguide 208 is transferred to the second SiN waveguide 224A in the interposer 104. The photonic system 200 further includes a second optical mode portion generally located between reference lines 5 and 7 where the optical signal propagates in an optical mode. The photonic system 200 further includes a third coupler portion generally located between reference lines 7 and 8 where the optical signal is converted into fiber mode in both the second Sin waveguide 224A and the third SiN waveguide 224B.

The interposer waveguide strip 222 includes the interposer waveguides 224A and 224B and generally includes the portion of the interposer waveguides 224A and 224B between reference lines 1 and 8 and may extend away from a coupler portion (e.g., to the right in FIG. 3A). The interposer waveguides 224A and 224B may be formed and therefore coupled, along with potentially one or more other interposer waveguides, to the Si PIC 102 of FIG. 2. In some embodiments, the interposer waveguide 224A may have a thickness $t_{224A}$ (e.g., in the y direction) that varies between, for example, 20 nm to 250 nm, and an index of refraction of about 1.986 for the interposer waveguides 224A and about 1.446 for the interposer cladding 225. The interposer waveguide 224B may have a thickness $t_{224B}$ (e.g., in the y direction), for example, of 20 nm, and an index of refraction of about 1.986 for the interposer waveguide 224B and about 1.446 for the interposer cladding 225. Further, the index of refraction of the interposer waveguides 224A and 224B are greater than that of the interposer cladding 225, and the interposer waveguides 224A and 224B may have effective index in a range from 1.50 to 1.65. Effective index is defined as the overlap integral of the optical field with the refractive index profile of the waveguide. Consider a SiN waveguide with a $SiO_2$ cladding. Importantly, as the SiN waveguide width is reduced in a taper, the effective index reduces since a larger fraction of the optical mode overlaps with the surrounding lower index $SiO_2$. Note that the low end of the range of effective index for the interposer waveguide mode is determined by the minimum taper tip width afforded by the SiN fabrication process, which here is assumed to be on the order of 200 nm. For instance, the minimum taper tip width for SiN waveguides may be 180 nm. If the process allows for a smaller tip width for the SiN, a correspondingly lower refractive index for the interposer will be allowed. This is because adiabatic coupling transition occurs when the effective indices of the SiN waveguide and interposer waveguide are substantially the same. Decreasing the SiN tip width reduces the effective index of the SiN waveguide allowing a lower material index for the interposer.

It can be seen from FIG. 3A that, although the second and third interposer waveguides 224A and 224B are displaced in the y direction from the first SiN waveguide 208, the coupler portion of the interposer SiN waveguides 224A and 224B is nevertheless aligned in the x and z directions with the tapered end of the first SiN waveguide 208 such that the coupler portion of the interposer waveguide 224A overlaps the tapered end of the SiN waveguide 208 (as seen in the view 300A) and is parallel thereto (as seen in the view 300B).

The views 300C-300H of FIG. 3B depict widths (e.g., in the x direction) of the tapered end of each of the Si waveguide 212 and the SiN waveguides 208, 224A, and 224B at, respectively, reference lines 1-8 of FIG. 3A. For instance, from the view 300C, it can be seen that a width of the Si waveguide 212 tapers from a width $w_{Si1}$ of about 0.32 μm at reference line 1 to a width $w_{Si2}$ of about 0.08 μm (or 80 nm) at reference line 2. Also, the thickness of second SiN waveguide 224A reverse tapers (i.e., vertically increases) in thickness from a thickness $t_{224A1}$ of about 20 nm to an intermediate thickness $t_{224A3}$ of less than 0.25 μm. Further, the thickness of third SiN waveguide 224B remains constant at about 20 nm throughout all reference lines 1-8. The oxide SiO2 225 separating the second SiN waveguide 224A and the third SiN waveguide 224B remains constant at about 1 μm throughout all reference lines 1-8.

Also, from the views 300E and 300F, it can be seen that a width of the first SiN waveguide 208 tapers from width $w_{SiN1}$ of about 1.0 μm at reference line 4 to width $w_{SiN2}$ of about 0.20 μm (or 200 nm) at reference line 5. As another design example, the width $w_{SiN1}$ can be about 1.5 μm at reference line 4 tapered to the width $w_{SiN2}$ of about 0.08 μm at reference line 5.

The tapered ends of the Si waveguide 212 and the SiN waveguide 208 provide adiabatic transitions for optical signals from the Si waveguide 212 to the first SiN waveguide 208 and from the first SiN waveguide 208 to the second SiN waveguide 224A, or adiabatic transitions for optical signals traveling in the opposite direction. An adiabatic transition may be achieved by changing the structure and/or an effective index of the tapered ends of the Si and the first SiN waveguides 212 and 208 in a sufficiently slow manner so light is not scattered from its mode when it is incident on the tapered ends and continues propagating in this same mode when it exits the tapered ends and enters the coupler portion of the second SiN waveguide 208 or the second SiN waveguide 224A on the interposer. That is, the light may experience a gradual transition between the tapered end of the Si waveguide 208 or first SiN waveguide 212 and the y-axis displaced and adjacent coupler portion of the first SiN waveguide 208 or the second SiN waveguide 224A such that the mode does not change and no significant scattering of light takes place. Accordingly, the tapered end of the Si waveguide 212 combined with the coupler portion of the first SiN waveguide 208 is an example of an adiabatic coupler region. The tapered end of the first SiN waveguide 208 and the coupler portion of the second SiN waveguide 224A is another example of an adiabatic coupler region.

Further, from the views 300G and 300H, from line 6 to line 7 it can be seen that a thickness $t_{224A6}$ of the second SiN waveguide 224A tapers from a thickness $t_{224A6}$ of about 250 nm at reference line 6 to a thickness $t_{224A7}$ of about 20 nm at reference line 7. The second SiN waveguide 224A and the third SiN waveguide 224B are separated by SiO2 having a thickness $t_{SiO1}$ of about 1 μm.

Yet further, from the view 300H, from reference line 7 extending to the right of FIG. 3A, the second SiN waveguide 224A and the third SiN waveguide 224B engage in optical coupling such that the SiN waveguides 224A and 224B engage in conversion from optical mode to fiber mode for coupling to an optical fiber such as a single-mode fiber (SMF) 390.

As illustrated in FIG. 3A through FIG. 3G, the second SiN waveguide 224A tapers or varies in thickness. Such thickness variation of a waveguide provides a higher index interposer which may ensure an improved effective index matching with the first SiN waveguide 208 of the Si PIC 102. Further, such a varying waveguide profile improves the TM mode coupling performance. Further, an adiabatic taper is required for coupling between the Si waveguide 212 and the first SiN waveguide 208, and for coupling between the first SiN waveguide 208 and the second SiN waveguide 224A. Such tapers may terminate with a finite tip size that may vary with process variations. Tapering and reversed tapering of the thickness of the waveguide is more tolerant to process variations. Further, thickness tailoring of a waveguide may further provide a better coefficient of thermal expansion (CTE).

One technique for thickness tapering of a waveguide, such as the second SiN waveguide 224A, may be performed using techniques, an example of which may be a TriPleX™ process by LioniX.

In operation, the structure, refractive index, and/or other characteristics of an optical medium may determine an effective index of the optical medium. Effective index is somewhat analogous to energy levels in quantum mechanics. Higher effective index is analogous to lower energy level. Thus, for two adjacent optical media with different effective indexes, light tends to propagate through the medium with the higher effective index.

In the embodiments described herein, and with particular reference to FIG. 3A through FIG. 3G, Si waveguides may generally have a higher effective index than SiN waveguides. By tapering the end of an Si waveguide, the effective index may be reduced along the length of the tapered end until the effective index of the Si waveguide approximately matches or even becomes smaller than the effective index of a y-axis displaced SiN waveguide, such as illustrated in FIG. 3A through FIG. 3G. Accordingly, light propagating through the Si waveguide 212 and exiting through its tapered end may exit the tapered end of the Si waveguide 212 and enter the first SiN waveguide 208 about at a point where the effective index of the tapered end of the Si waveguide 212 matches an effective index of the first SiN waveguide 208. Analogously, the first SiN waveguide 208 may be tapered at its end until its effective index approximately matches or even becomes smaller than the effective index of a y-axis displaced third SiN waveguide 224B, such as illustrated in FIG. 3A through FIG. 3G. Accordingly, light propagating through the first SiN waveguide 208 and exiting through its tapered end may exit the tapered end of the first SiN waveguide 208 and enter the second SiN waveguide 224A on the interposer about at a point where the effective index of the tapered end of the first SiN waveguide 208 matches an effective index of the second SiN waveguide 224A.

Such fine dimensions may not be achievable for some fabs/manufacturers and/or may be inconsistent with existing processes of these fabs/manufacturers. In addition, smaller Si waveguides generally have higher insertion loss than relatively larger Si waveguides, making them disadvantageous. The adiabatic coupling length between Si and Polymer waveguides may be on the order of 2 mm, over which such a narrow Si waveguide would introduce unwanted optical loss.

The embodiments described herein implement a two-stage adiabatic coupling where the first SiN waveguide has an intermediate index of refraction between that of the Si waveguide and of the second SiN waveguide, such that the effective index of the Si waveguide may be matched to the effective index of the SiN waveguide by fabricating the SiN waveguide and/or its tapered end with larger dimensions that are achievable by the fabs/manufacturers and that allow the use of a larger, lower loss SiN waveguide. Here, the adiabatic coupling length from the Si waveguide to the first SiN waveguide may be quite small, e.g., about 50-200 μm. In this case the higher loss of the small ~80 nm wide Si waveguide does not introduce significant loss and the loss is significantly less than the narrower Si waveguide over 2 mm as described above. The adiabatic coupler region between the first SiN waveguide and the second SiN waveguide may be around 2 mm, where the lower loss of the second SiN waveguide relative to the first Si waveguide leads to less loss as compared with direct adiabatic coupling between Si and interposer waveguides.

Figure 3G:
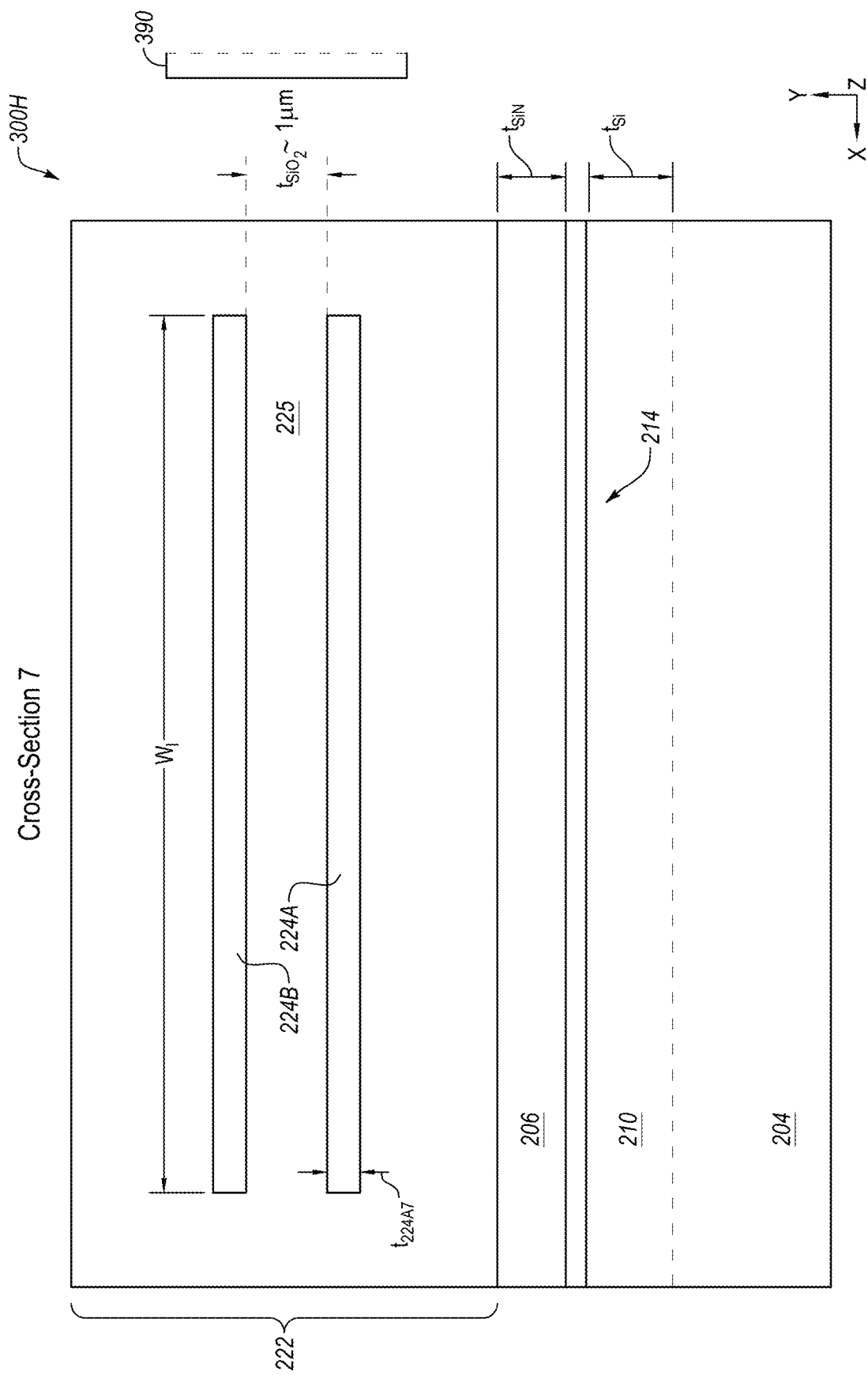
Figure 4:
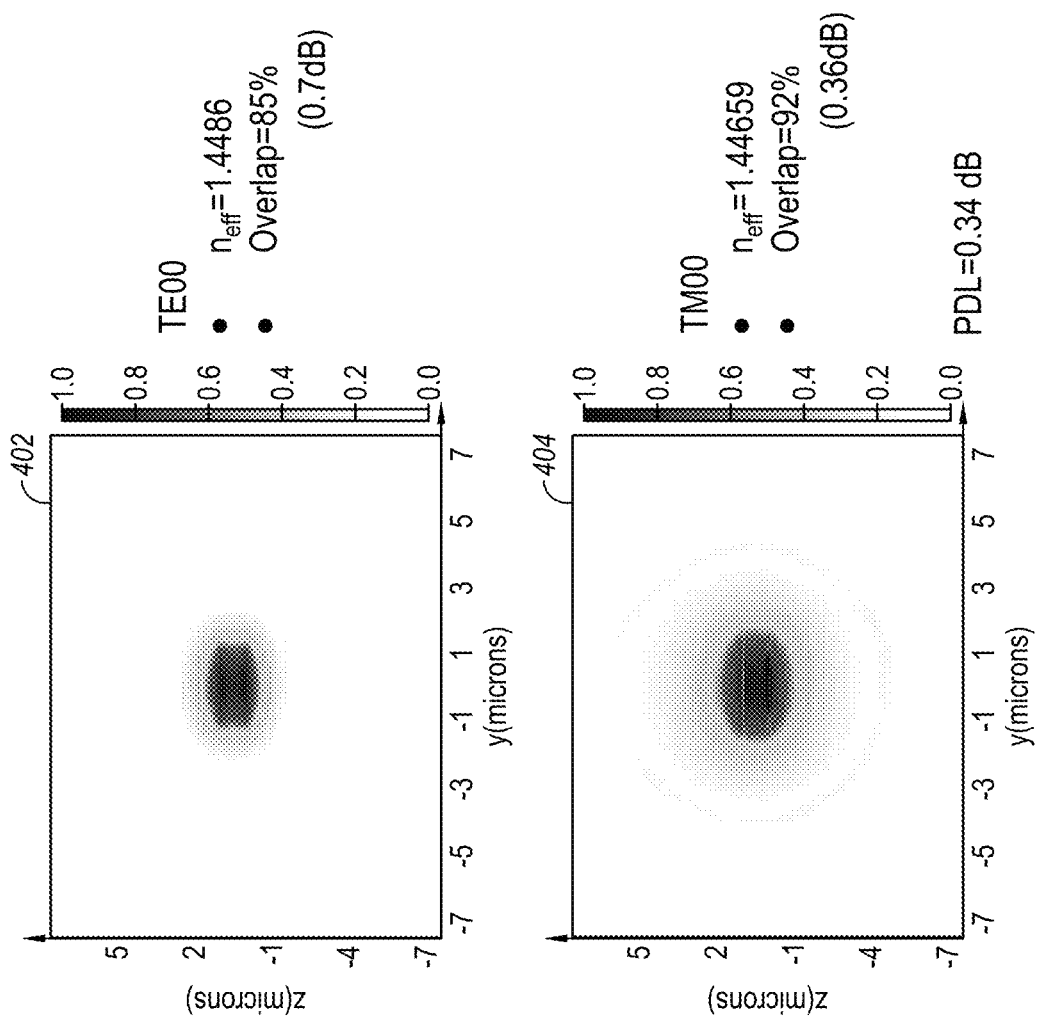
FIG. 4 includes graphical representations of simulated light modes in the interposer waveguide strip.
Figure 4:
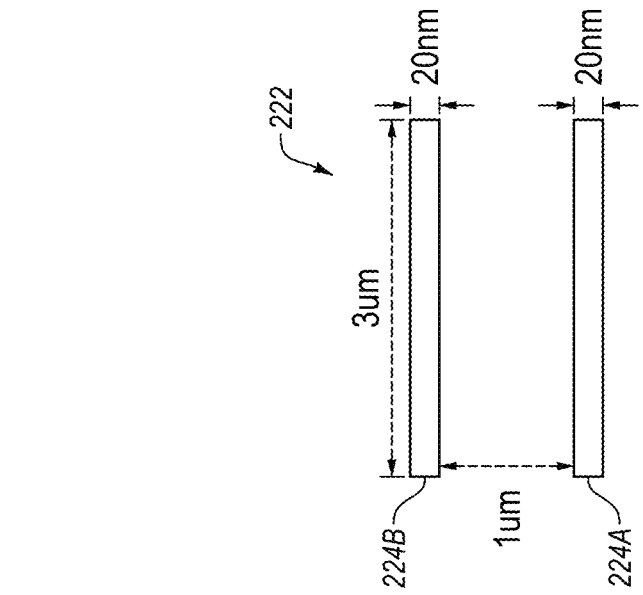

FIG. 4 includes graphical representations of simulated light modes of TE and TM polarized light in the interposer waveguide strip 222 including the second SiN waveguide 224A and the third SiN waveguide 224B of FIG. 3G. Plot 402 illustrates a plot of the TE mode coupling between the interposer waveguide strip 222 and the SMF 390 of FIG. 3G. As illustrated, the TE mode couples with about an 85% mode overlap with the SMF which equates to approximately 0.7 dB. Further, plot 404 illustrates a plot of the TM mode coupling between the interposer waveguide strip 222 and the SMF 390 of FIG. 3G. As illustrated, the TM mode couples with about a 92% mode overlap with the SMF which equates to approximately 0.36 dB.

Figure 5A:
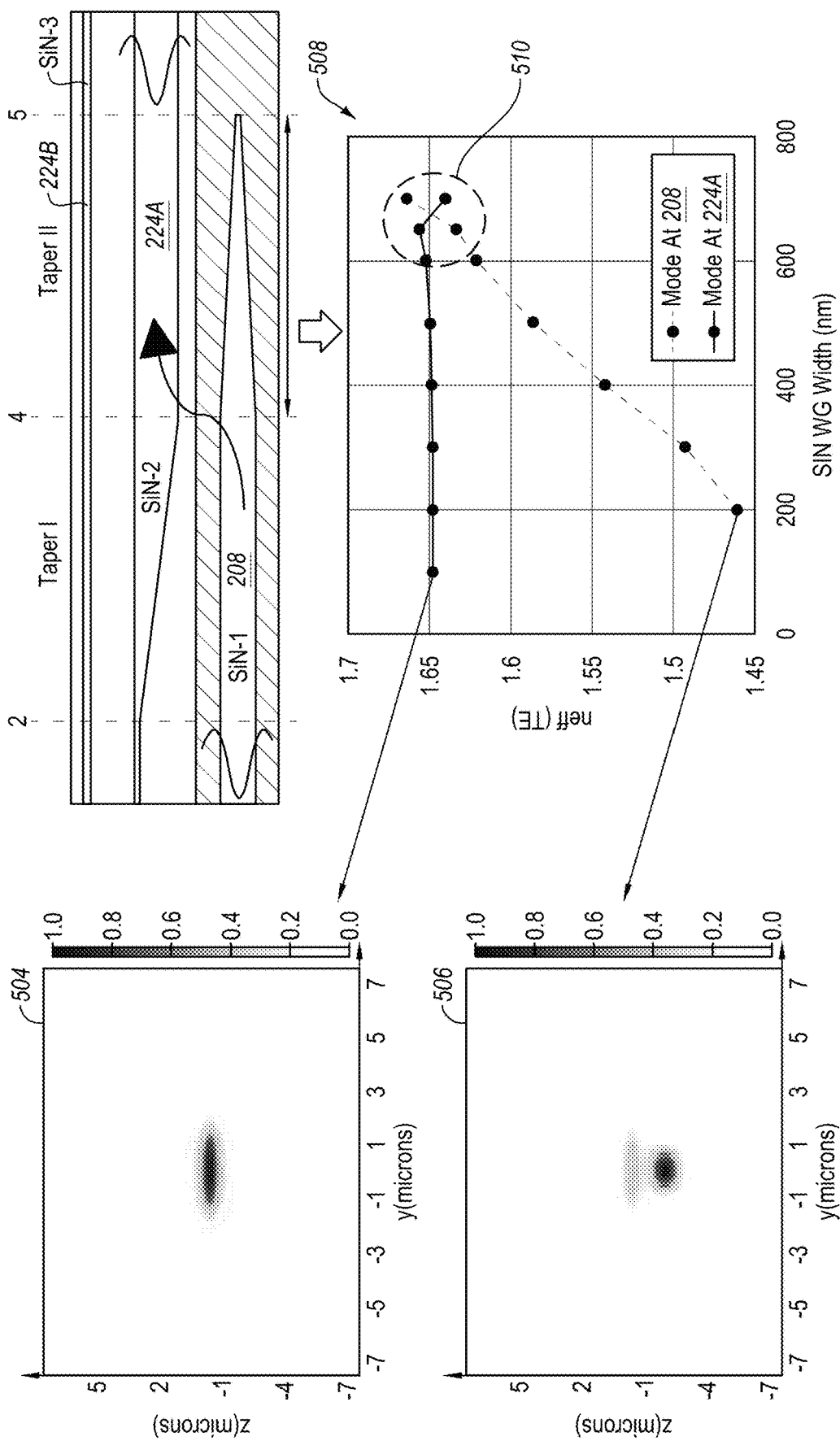
FIGS. 5A-5B illustrate plots relating to the modes and effective indexes occurring in a taper of waveguide.

FIG. 5A illustrates plots relating to the modes and effective indexes occurring between the reference number 4 and reference number 5 of FIG. 3A. A mode profile plot 504 illustrates the mode in the second SiN waveguide 224A and the mode profile plot 506 illustrates the mode in the first SiN waveguide 208. It is noted that the second SiN waveguide 224A is illustrated as a cross-sectional view of the waveguide while the first SiN waveguide 208 is illustrated as a top view in order to illustrate the relationships of the tapering of both waveguides.

Figure 5B:
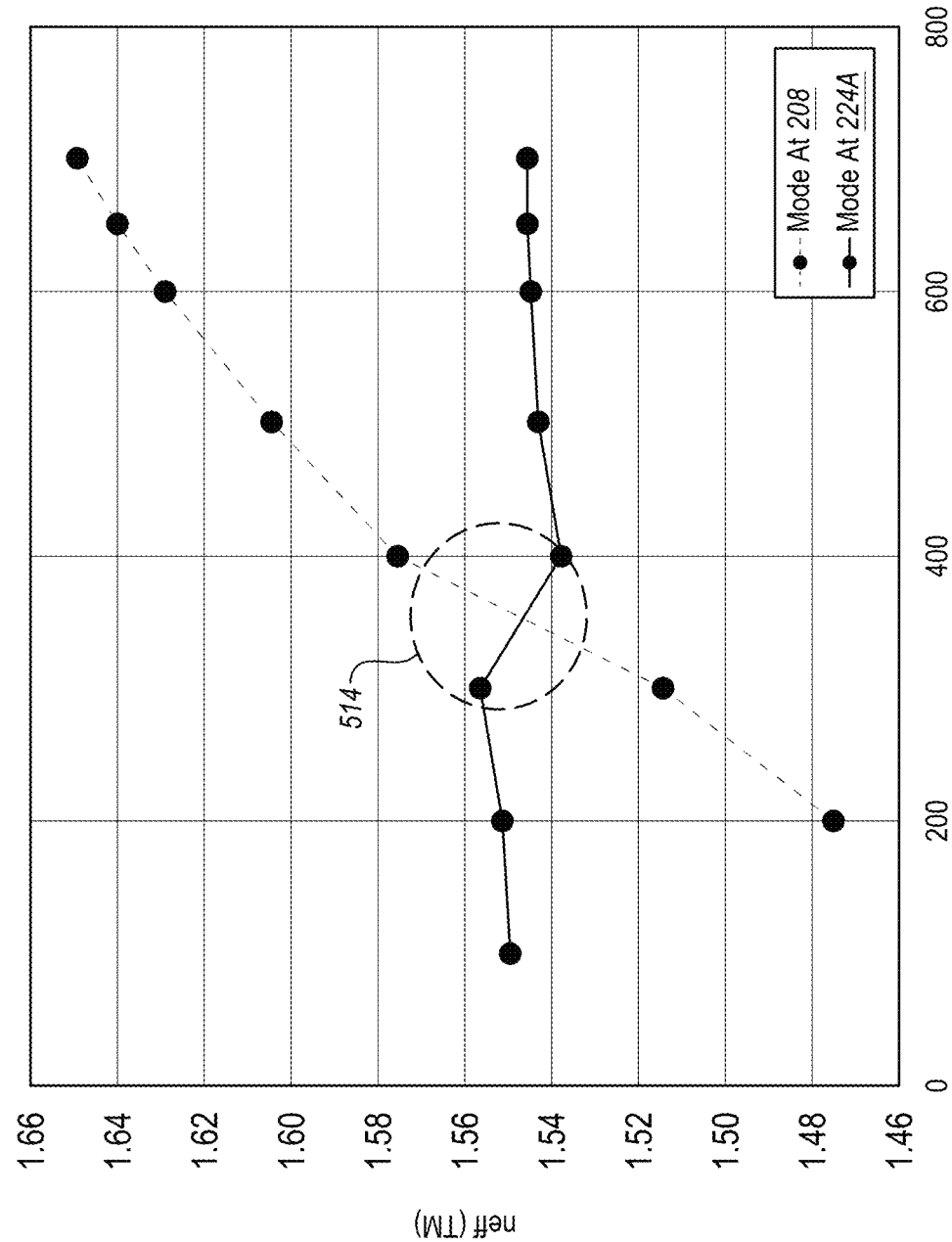

In FIG. 5A, plot 508 illustrates a coupling region 510 where the effective indexes for the TE modes are compatible for evanescence coupling between the first SiN waveguide 208 and the second SiN waveguide 224A. In FIG. 5B, plot 512 illustrates a coupling region 514 where the effective indexes for the TM modes are compatible for evanescence coupling between the first SiN waveguide 208 and the second SiN waveguide 224A.

Figure 6:
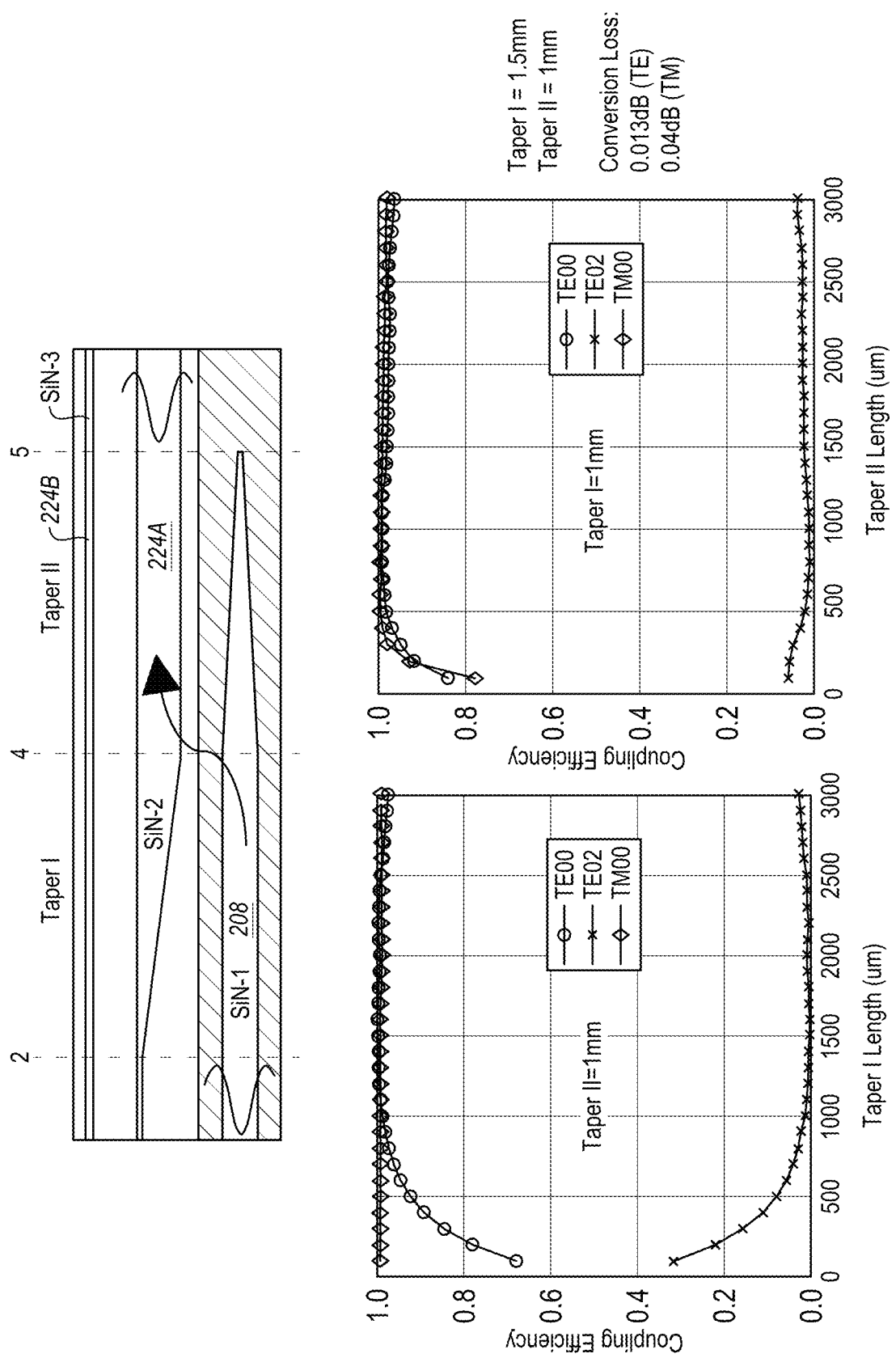
FIG. 6 illustrates the length of the tapers compared to coupling efficiency for waveguides in the system.

FIG. 6 illustrates the length of the tapers compared to coupling efficiency. The length of each of the tapers provides for further optimization of the coupling efficiency. Generally, an increased taper length improves the coupling efficiency for various modes. Taper I relates to the vertical taper for the second SiN waveguide 224A and taper II relates to the horizontal taper for the first SiN waveguide 208. In one example illustrated in FIG. 6, when the length of Taper I for the second SiN waveguide 224A is approximately 1.5 mm and the length of the Taper II for the first SiN waveguide 208 is approximately 1 mm, then the conversion loss for the TE mode is approximately 0.013 dB and the conversion loss for the TM mode is approximately 0.04 dB. Further, the plots of FIG. 6 illustrate that most of the coupling occurs with respect to the fundamental mode.

Figure 7:
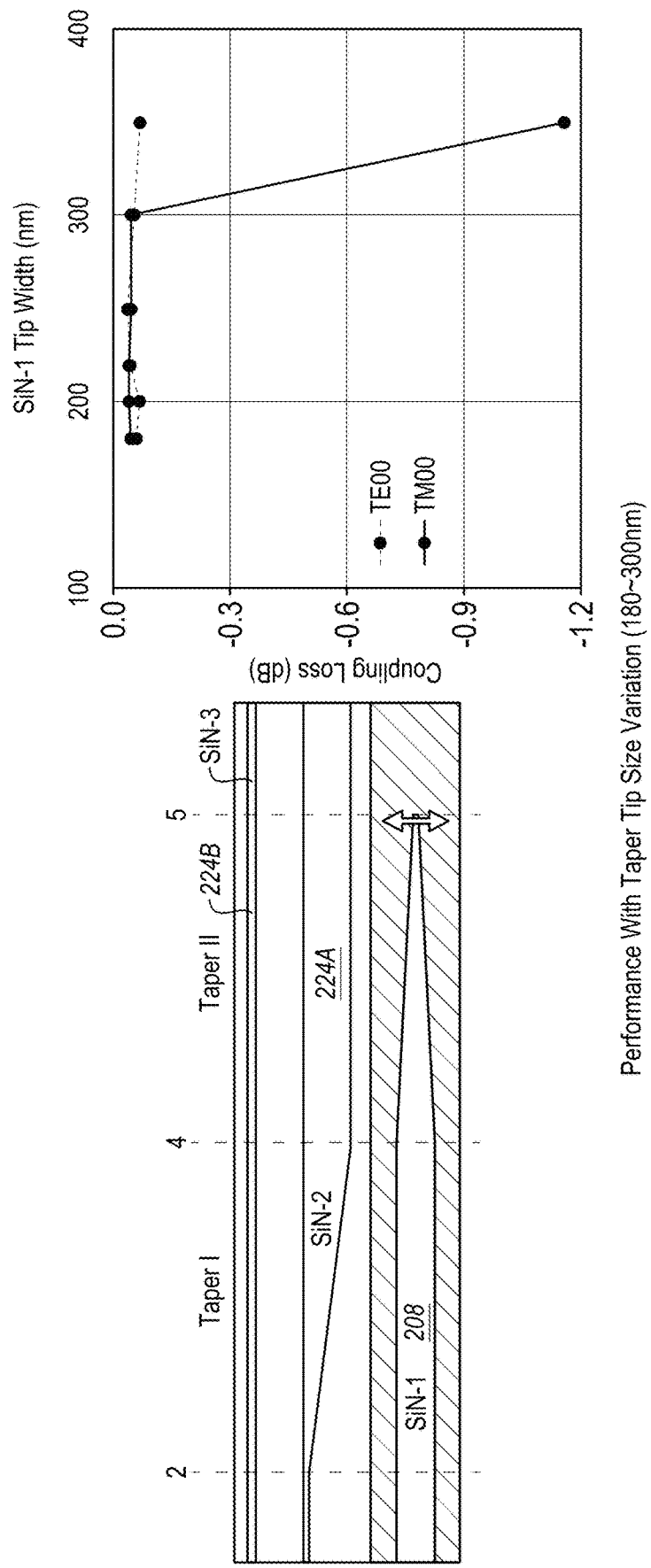
FIG. 7 illustrates the effect of the tip size of a first SiN waveguide with respect to the coupling loss with a second SiN waveguide in a system.

FIG. 7 illustrates the effect of the tip size of the first SiN waveguide 208 with respect to the coupling loss with the second SiN waveguide 224A. As illustrated, processes do not need excessive precision to accommodate a very small tip width since coupling loss remains negligible for tip widths as large as approximately 300 nm.

Figure 8:
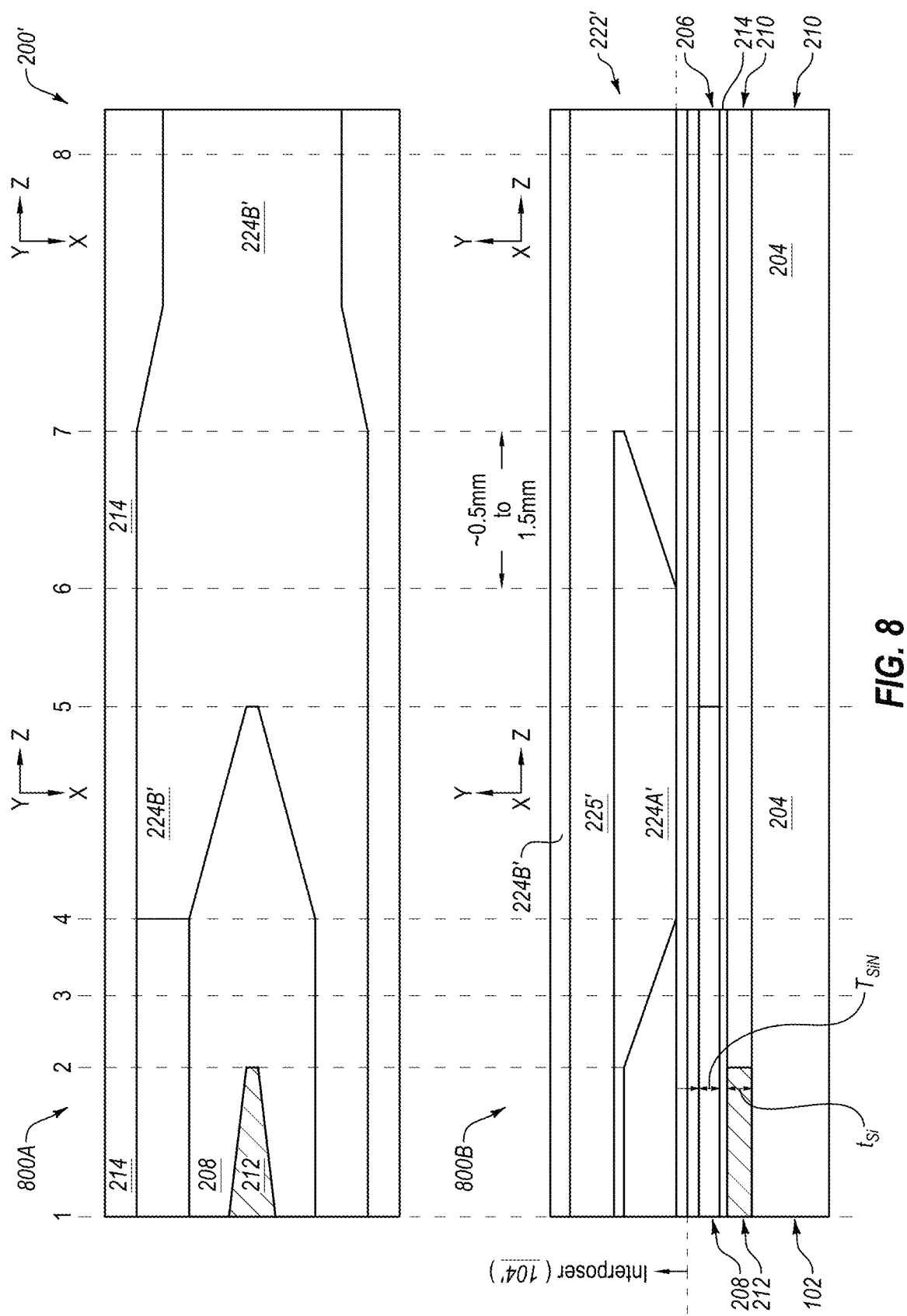
FIG. 8 includes a view of portions of the photonic system of FIGS. 1 and 2, in accordance with another embodiment.

FIG. 8 illustrates an alternative embodiment of the interposer and waveguides described above with respect to FIG. 3A and other associated figures. Generally, the present embodiment illustrates the vertically tapered second SiN waveguide 224A' continuing to vertically taper to zero resulting in the third SiN waveguide 224B' engaging in optical coupling with the SMF.

The overhead view 800A of FIG. 8 illustrates a topological view 800A and a longitudinal cross-sectional view 800B which further illustrates an example material stack up for the various components, most components of which are described above with respect to FIG. 3A.

The portion of the photonic system 200' illustrated in the view 800A of FIG. 8 includes an interposer waveguide strip 222'. The interposer waveguide strip 222' includes the second SiN waveguide 224A', cladding 225', and the third SiN waveguide 224B'. Additionally, the second SiN waveguide 224A' includes a first vertically tapered portion (substantially between reference lines 2 and 4), a high-contrast coupler portion (substantially between reference lines 4 and 6), a second vertically tapered portion (substantially between reference lines 6 and 7), and no portion extending beyond reference line 7. The second vertically tapered portion may be of a length, for example, of between 0.5 and 1.5 mm.

The photonic system 200' includes a first optical mode portion generally located to the left of reference line 1 where an optical signal propagates by optical mode in the Si waveguide 212. The photonic system 200' includes a first coupler portion in the PIC 102 generally located between reference lines 1 and 2 where an optical mode of the optical signal in the Si waveguide 212 is transferred to the first SiN waveguide 208. The photonic system 200' includes a second coupler portion generally located between reference lines 4 and 5 where an optical mode of the optical signal in the first SiN waveguide 208 is transferred to the second SiN waveguide 224A' in the interposer 104'. The photonic system 200' further includes a second optical mode portion generally located between reference lines 5 and 7 where the optical signal propagates in an optical mode. The photonic system 200' further includes a third coupler portion generally located between reference lines 7 and 8 where the optical signal is converted into fiber mode in both the second SiN waveguide 224A' and the third SiN waveguide 224B'.

The interposer waveguide strip 222' includes the interposer waveguides 224A' and 224B' and generally includes the portion of the interposer waveguides 224A' and 224B' between reference lines 1 and 8 and may extend away from a coupler portion (e.g., to the right in FIG. 8). The interposer waveguides 224A' and 224B' may be formed and therefore coupled, along with potentially one or more other interposer waveguides, to the SiPIC 102 of FIG. 2. In some embodiments, the interposer waveguide 224A' may have a thickness $t_{224A}$ (e.g., in the y direction) that varies between, for example, 20 nm to 250 nm, and an index of refraction of about 1.51 for the interposer SiN waveguide 224A' and about 1.5 for the interposer cladding 225'. The interposer waveguide 224B' may have a thickness $t_{224B}$ (e.g., in the y direction), for example, of 20-25 nm, and an index of refraction of about 1.51 for the interposer SiN waveguide 224B' and about 1.5 for the interposer cladding 225'.

Further, the index of refraction of the interposer SiN waveguides 224A' and 224B' are greater than that of the interposer cladding 225', and the interposer waveguides 224A' and 224B' may have indexes of refraction in a range from 1.509 to 1.52. Note that the low end of the range of refractive index for the interposer is determined by the minimum taper tip width afforded by the SiN fabrication process, which here is assumed to be on the order of 200 nm. For instance, the minimum taper tip width for SiN waveguides may be 180 nm. If the process allows for a smaller tip width for the SiN, a correspondingly lower refractive index for the interposer will be allowed. This is because adiabatic coupling transition occurs when the effective indices of the SiN waveguide and interposer waveguide are substantially the same. Decreasing the SiN tip width reduces the effective index of the SiN waveguide allowing a lower material index for the interposer.

It can be seen from FIG. 8 that the second SiN waveguide 224A' terminates at reference line 7 and the third SiN waveguide 224B' may horizontally or laterally taper from a first width (e.g., 8 μm) at reference line 7 to a second width (e.g., 7 µm) at reference line 8 or at an intermediate reference line (not shown) between reference line 7 and reference line 8.

Figure 9:
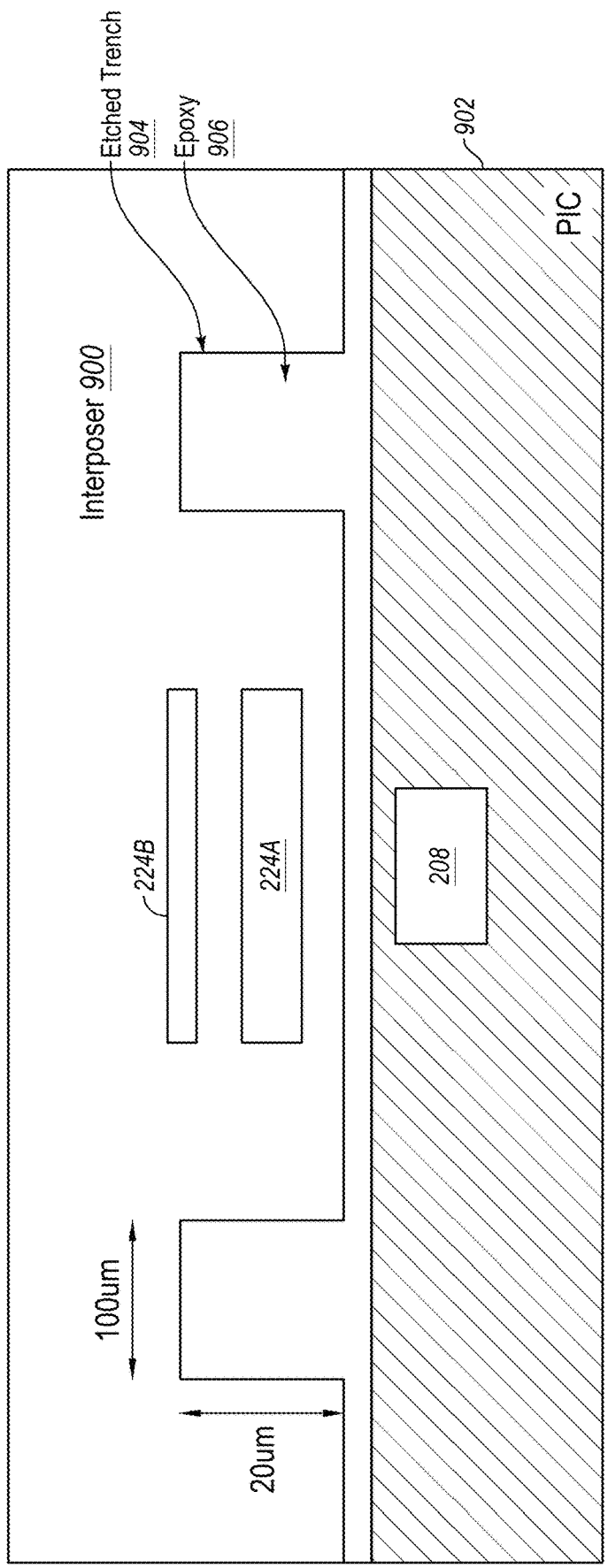
FIG. 9 illustrates a bonding process for coupling an interposer to a PIC.

FIG. 9 illustrates a bonding process for coupling an interposer 900 to a PIC 902. In one embodiment, one or more trenches 904 may be formed in the interposer 900 by various techniques including etching by chemical or mechanical processes. The trenches 904 may form reservoirs for an adhesive such as epoxy 906. The trenches 904 may receive therein excess epoxy 906 and may provide further lateral support between the interposer 900 and the PIC 902. The trenches 904 further accommodate formation of a thin epoxy bondline between the second SiN waveguide 224A and the first SiN waveguide 208 which assists in reducing optical coupling loss.

Figure 10:
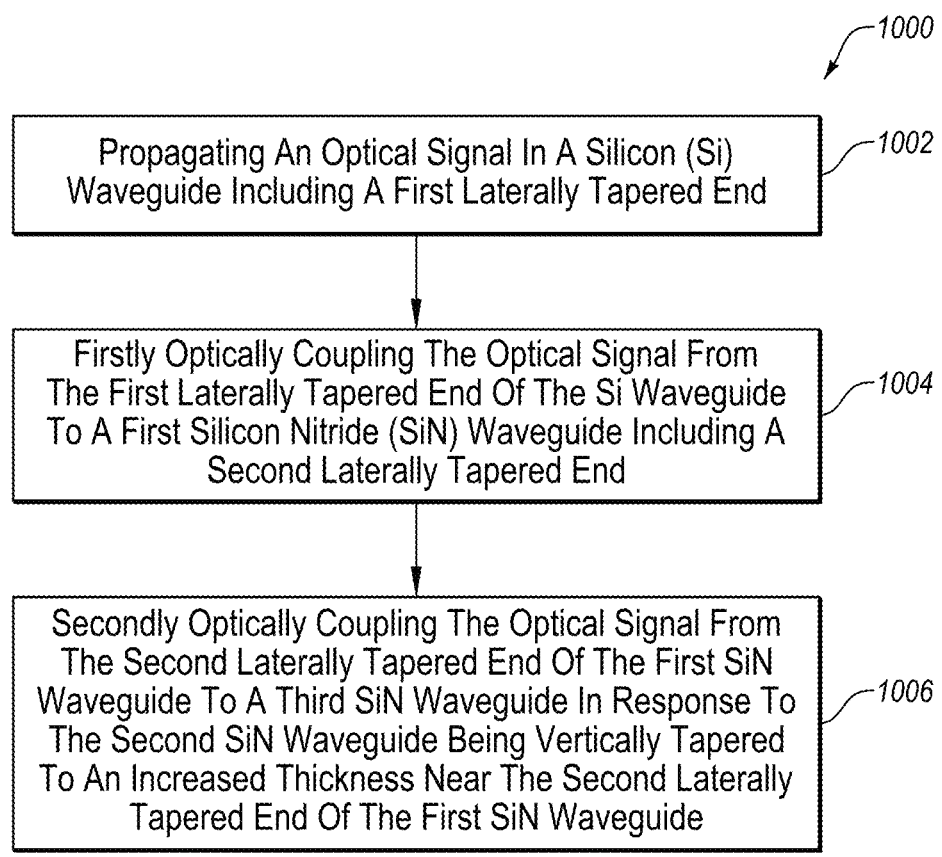
FIG. 10 illustrates a method for coupling an optical signal from a PIC to a SMF.

FIG. 10 illustrates a method 1000 for coupling an optical signal from a PIC to an SMF. The method 1000 includes a step 1002 for propagating an optical signal in a silicon (Si) waveguide including a first laterally tapered end. The method 1000 also includes a step 1004 for firstly optically coupling the optical signal from the first laterally tapered end of the Si waveguide to a first silicon nitride (SiN) waveguide including a second laterally tapered end. The method 1000 further includes a step 1006 for secondly optically coupling the optical signal from the second laterally tapered end of the first SiN waveguide to a third SiN waveguide in response to the second SiN waveguide being vertically tapered to an increased thickness near the second laterally tapered end of the first SiN waveguide.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A photonic system, comprising:
a photonic integrated circuit (PIC) including a first silicon nitride (SiN) waveguide; and
an interposer including a second SiN waveguide that vertically tapers with an increasing thickness in a direction toward the first SiN waveguide to allow an adiabatic optical mode transfer between the first SiN waveguide and vertically tapers with a decreasing thickness in a direction away from the first SiN waveguide to allow an adiabatic optical mode transfer between the second SiN waveguide and a third SiN waveguide, wherein:
the first SiN waveguide includes a tapered end having a first effective refractive index n1; and
the second and third SiN waveguides together form first and second low-index contrast portions of effective index n2 at two ends, a third high-index contrast portion section between the first and second low-index contrast portions, the third high-index contrast portion having a third effective index n3 and vertical tapers adiabatically coupling the first and second low-index contrast portions to the third high-index contrast portion between the first and second low-index contrast portions,
n3 approaches n1, and n3>n2, and the tapered end of the first SiN waveguide is optically coupled to the third high-index contrast portion of the interposer.

2. The photonic system of claim 1, further including an Si waveguide including a taper at one end to adiabatically couple light between the Si waveguide and the first SiN waveguide.

3. The photonic system of claim 1, wherein the second SiN waveguide of the interposer terminates after decreasing in thickness.

4. The photonic system of claim 1, wherein the first SiN waveguide includes a first lateral taper to allow an optical mode transfer between the first SiN waveguide to the second SiN waveguide.

5. The photonic system of claim 1, wherein the third SiN waveguide is adjacent to the second SiN waveguide, the third SiN waveguide configured to allow an optical mode transfer between the second SiN waveguide and the third SiN waveguide.

6. The photonic system of claim 5, wherein the second SiN waveguide and the third SiN waveguide are configured to facilitate optical mode transfer with the first SiN waveguide when the second SiN waveguide and the third SiN waveguide are configured as high-contrast waveguides with the second and third SiN waveguides having thicknesses of about 250 nm and 20 nm respectively, and spaced apart by about 1 µm.

7. The photonic system of claim 6, wherein the second SiN waveguide and the third SiN waveguide are configured to inhibit optical mode transfer with the first SiN waveguide when the second SiN waveguide and the third SiN waveguide are configured as low-contrast waveguides with the second and third SiN waveguides each having a thickness of about 20 nm, and spaced apart by about 1 µm.

8. A photonic system, comprising:
a silicon (Si) waveguide including a first lateral taper on a terminal end, the Si waveguide configured to propagate an optical signal in an optical mode;
a first silicon nitride (SiN) waveguide including a non-tapered portion configured to adiabatically optically couple the optical signal from the first lateral taper of the Si waveguide, the first SiN waveguide further including a second lateral taper on a terminal end; and
a second SiN waveguide including a first vertical taper to increase a thickness of the second SiN waveguide to adiabatically couple the optical signal between the first SiN waveguide and the second SiN waveguide, the first SiN waveguide terminating before the second lateral taper, the second SiN waveguide further including a second vertical taper to decrease the thickness of the second SiN waveguide and
a third SiN waveguide, wherein:
the first SiN waveguide includes a tapered end having a first effective refractive index n1; and
the second and third SiN waveguides together form first and second low-index contrast portions of effective index n2 at two ends, a third high-index contrast portion section between the first and second low-index contrast portions, the third high-index contrast portion having a third effective index n3 and vertical tapers adiabatically coupling the first and second low-index contrast portions to the third high-index contrast portion between the first and second low-index contrast portions, n3 approaches n1, and n3>n2, and the tapered end of the first SiN waveguide is optically coupled to the third high-index contrast portion.

9. The photonic system of claim 8, wherein the second SiN waveguide and the third SiN waveguide are configured to facilitate optical mode transfer with the first SiN waveguide when the second SiN waveguide and the third SiN waveguide are configured as high-contrast waveguides.

10. The photonic system of claim 9, wherein the second SiN waveguide and the third SiN waveguide are configured to inhibit optical mode transfer with the first SiN waveguide when the second SiN waveguide and the third SiN waveguide are configured as low-contrast waveguides.

11. The photonic system of claim 9, wherein the Si waveguide and the first SiN waveguide are configured as part of a photonic integrated circuit (PIC) and the second SiN waveguide and the third SiN waveguide are configured as part of an interposer for coupling with the PIC.

12. The photonic system of claim 9, wherein the second SiN waveguide vertically tapers between a thickness of about 20 nm to about 250 nm.

13. The photonic system of claim 9, wherein the second SiN waveguide and the third SiN waveguide are separated by a distance of about 1 µm.

* * * * *